(12) United States Patent
Hamano et al.

(10) Patent No.: US 12,420,963 B2
(45) Date of Patent: Sep. 23, 2025

(54) STORAGE DEVICE, UNMANNED AERIAL VEHICLE, AND SYSTEM

(71) Applicant: NIPPON TELEGRAPH AND TELEPHONE CORPORATION, Tokyo (JP)

(72) Inventors: Yujin Hamano, Tokyo (JP); Atsushi Aratake, Tokyo (JP); Yosuke Sakurada, Tokyo (JP); Daisuke Uchibori, Tokyo (JP); Kazuaki Watanabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 57 days.

(21) Appl. No.: 18/268,945

(22) PCT Filed: Dec. 24, 2020

(86) PCT No.: PCT/JP2020/048563
§ 371 (c)(1),
(2) Date: Jun. 21, 2023

(87) PCT Pub. No.: WO2022/137460
PCT Pub. Date: Jun. 30, 2022

(65) Prior Publication Data
US 2024/0059402 A1    Feb. 22, 2024

(51) Int. Cl.
*B64U 10/13* (2023.01)
*B64U 70/99* (2023.01)
(Continued)

(52) U.S. Cl.
CPC ............. *B64U 80/00* (2023.01); *B64U 10/13* (2023.01); *B64U 70/99* (2023.01); *B64U 80/10* (2023.01);
(Continued)

(58) Field of Classification Search
CPC ........ B64U 70/50; B64U 70/99; B64U 80/10; B64U 80/70
See application file for complete search history.

(56) References Cited

U.S. PATENT DOCUMENTS

| 10,689,107 B2 * | 6/2020 | Baracaldo Angel ... G08B 17/10 |
| 2016/0011592 A1 | 1/2016 | Zhang et al. |

(Continued)

FOREIGN PATENT DOCUMENTS

| JP | 2018140704 A | 9/2018 |
| JP | 2018199403 A | 12/2018 |
| WO | 2020030919 A1 | 2/2020 |

OTHER PUBLICATIONS

Unknown Author (2018) "[Drone technique] Drone hand catch method and necessity [Notes]" Skyfish's Drone Blog, Apr. 8, 2018 [online] website: https://www.droneskyfish.com/entry/hand-catch-drone.

(Continued)

*Primary Examiner* — Nicholas McFall

(57) ABSTRACT

A storage device (10) that stores an unmanned aerial vehicle (30) includes a gripping portion (11) for gripping the unmanned aerial vehicle (30), and a main body portion (10) having a suction surface (21) to which an upper surface (313) of the unmanned aerial vehicle (30) is suctioned.

6 Claims, 48 Drawing Sheets

(51) Int. Cl.
*B64U 80/00* (2023.01)
*B64U 80/10* (2023.01)
*B64U 80/70* (2023.01)
B64U 101/26 (2023.01)
B64U 101/30 (2023.01)
B64U 101/70 (2023.01)

(52) U.S. Cl.
CPC .......... *B64U 80/70* (2023.01); *B64U 2101/26* (2023.01); *B64U 2101/30* (2023.01); *B64U 2101/70* (2023.01)

(56) References Cited

U.S. PATENT DOCUMENTS

| | | | |
|---|---|---|---|
| 2016/0280359 A1* | 9/2016 | Semke | B64U 60/60 |
| 2020/0407078 A1* | 12/2020 | Shimamoto | B64F 1/222 |
| 2021/0347500 A1 | 11/2021 | Hagan | |
| 2023/0271732 A1* | 8/2023 | Weirather | B64U 10/25 |
| | | | 244/13 |

OTHER PUBLICATIONS

Kenta Tsuchiya (2017) "Airmada's Fully Autonomous Drone Station" literature, Jan. 18, 2017 [online] website: https://www.borg.media/airmada-2017-01-18/.

Hang et al. (2019) "Perching and resting—A paradigm for UAV maneuvering with modularized landing gears" Science Robotics, vol. 4, No. 28.

* cited by examiner

STORAGE DEVICE, UNMANNED AERIAL VEHICLE, AND SYSTEM

CROSS-REFERENCE TO RELATED APPLICATIONS

This application is a U.S. National Stage Application filed under 35 U.S.C. § 371 claiming priority to International Patent Application No. PCT/JP2020/048563, filed on 24 Dec. 2020, the disclosure of which is hereby incorporated herein by reference in its entirety.

TECHNICAL FIELD

The present disclosure relates to a storage device, an unmanned aerial vehicle, and a system.

BACKGROUND ART

In recent years, unmanned aerial vehicles (for example, drones, multicopters, or the like) that fly by rotation of a plurality of propellers have been able to be used for inspection of infrastructure structures.

As a method for bringing such an unmanned aerial vehicle into and out of storage, using manual hand release and catching is known (Non Patent Literature 1). As another method, it is known to use a ground station that is installed on the ground and autonomously stores an unmanned aerial vehicle (Non Patent Literature 2). Furthermore, it is also known that two arms be provided in a lower part of the unmanned aerial vehicle, and a horizontally fixed rod be gripped with the two arms so that the unmanned aerial vehicle is suspended (Non Patent Literature 3).

CITATION LIST

Non Patent Literature

Non Patent Literature 1: "[Drone Techniques] Method and Necessity of Hand Catching of Drones [Notes]," [online], Apr. 8, 2018, [Retrieved on Dec. 1, 2020], Internet <URL:https://www.droneskyfish.com/entry/hand-catch-drone> Non Patent Literature 2: Kenta Tsuchiya, "AIRMADA's Fully Autonomous Drone Station," [online], Jan. 18, 2017, [Retrieved on Dec. 1, 2020], Internet <URL:https://www.borg.media/airmada-2017-01-18/> Non Patent Literature 3: Kaiyu Hang, et. al., "Perching and resting—A paradigm for UAV maneuvering with modularized landing gears," Science Robotics, No. 4, eaau6637(2019), 13 Mar. 2019.

SUMMARY OF INVENTION

Technical Problem

However, the method of using the hand release and catching requires human hands skilled in bringing unmanned aerial vehicles into and out of storage. Since it is assumed that a ground station is installed on the ground, when a ground station used is in an underground infrastructure facility, accumulated water due to water leakage or the like is generated, and an unmanned aerial vehicle may be damaged. In the method of providing the two arms in the lower part of the unmanned aerial vehicle and gripping the horizontal rod, it is necessary to provide the two arms in the unmanned aerial vehicle, and the unmanned aerial vehicle is vertically inverted when the horizontal rod is gripped. Therefore, devices provided in the unmanned aerial vehicle may be damaged by the oscillation at the time of vertical inversion.

An object of the present disclosure is to provide a storage device, an unmanned aerial vehicle, and a system capable of safely performing departure and return operations of an unmanned aerial vehicle without human intervention regardless of whether the unmanned aerial vehicle is under the ground or on the ground, or indoors or outdoors.

Solution to Problem

According to an embodiment, there is provided a storage device that stores an unmanned aerial vehicle, the storage device including a gripping portion for gripping the unmanned aerial vehicle, and a main body portion having a suction surface to which an upper surface of the unmanned aerial vehicle is suctioned.

According to another embodiment, there is provided an unmanned aerial vehicle including a propeller, a main body portion having a suction surface on an upper surface, the suction surface being for suctioning to a main body of a storage device, and a hook.

According to another embodiment, there is provided a system including the storage device and the unmanned aerial vehicle.

Advantageous Effects of Invention

According to the embodiments of the present disclosure, it is possible to safely perform departure and return operations of the unmanned aerial vehicle without human intervention regardless of whether the unmanned aerial vehicle is under the ground or on the ground, or indoors or outdoors.

DESCRIPTION OF EMBODIMENTS

Figure 1:
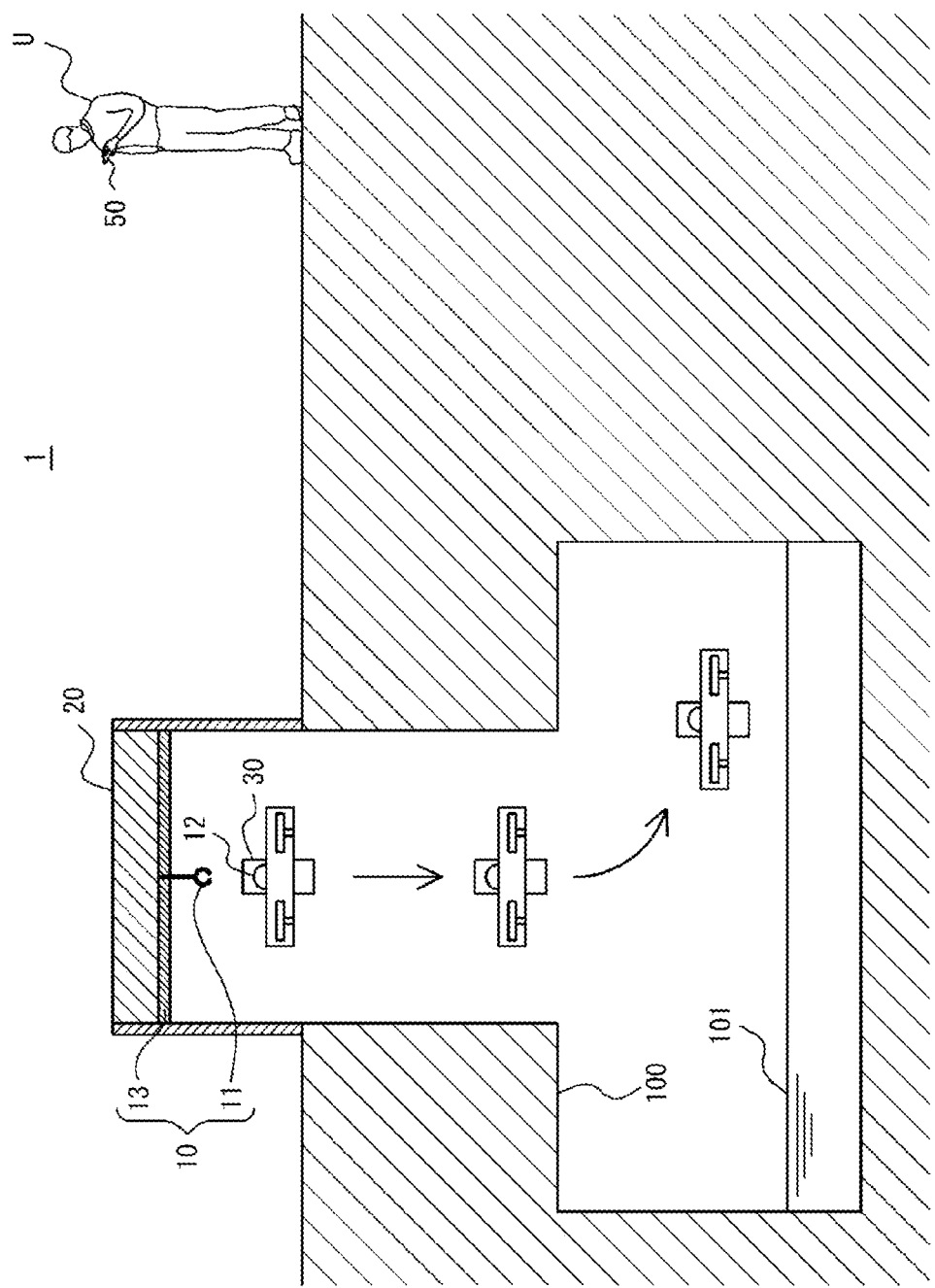
FIG. 1 is a view illustrating an outline of an inspection system according to an embodiment of the present disclosure.

Hereinafter, a storage device according to the present disclosure will be described in detail with reference to the drawings. Note that the drawings only schematically illustrate to the extent that the present invention can be sufficiently understood. Thus, the present invention is not limited only to the illustrated examples. In addition, for convenience of illustration, scales in the drawings may be different from actual scales.

(Inspection System)

First, an inspection system using a storage device according to the present disclosure will be described. FIG. 1 is a view illustrating an outline of an inspection system 1. The inspection system 1 illustrated in FIG. 1 includes a storage device 10 and an unmanned aerial vehicle 30. The inspection system 1 may further include a terminal 50. Note that FIG. 1 illustrates a case where the number of unmanned aerial vehicles 30 is one, but the number of the unmanned aerial vehicles 30 may be plural.

A removable lid is placed on an opening of a manhole 100 so as to close an entrance of the manhole 100. The storage device 10 has a structure that can be installed in place of the lid of the manhole 100. FIG. 1 illustrates a state in which the storage device 10 is installed in place of the lid of the manhole 100, that is, a state in which a main body portion 20 of the storage device 10 is installed above an upper hole of the manhole 100. However, the storage device 10 is not limited to the case of being installed in place of the lid of the manhole 100, and can be installed at any place regardless of whether it is under the ground or on the ground, or indoors or outdoors.

The manhole 100 is, for example, a communication manhole. The manhole 100 may be referred to as a maintenance hole. In the infrastructure facility in the manhole 100, accumulated water 101 due to water leakage or the like may be generated.

The terminal 50 is carried and operated by an operator (for example, an inspector) U of the unmanned aerial vehicle 30. Wireless communication is performed between the terminal 50 and the unmanned aerial vehicle 30. The operator U operates the terminal 50 to control the operation of the unmanned aerial vehicle 30. The unmanned aerial vehicle 30 can fly even without an instruction related to flight control from the terminal 50.

In the inspection system 1, the unmanned aerial vehicle 30 captures an image of the inside of the manhole 100 (in other words, an aerial image) while autonomously controlling the flight or controlling the flight according to the operation of the terminal 50 by the operator U. The unmanned aerial vehicle 30 may transmit the captured image data to the terminal 50. The operator U inspects the inside of the manhole 100 by checking the image data captured by the unmanned aerial vehicle 30. Note that items to be inspected by the operator U are, for example, the presence or absence of abnormality of the inner wall (that is, the wall surface) of the manhole 100, the state of groundwater stored in the underground passage leading to the manhole 100, the state of an object (structures, devices, or the like) installed in the manhole 100, and the like.

The storage device 10 that stores the unmanned aerial vehicle 30 includes a gripping portion 11 for gripping the unmanned aerial vehicle 30 and a main body portion 20 having a suction surface to which an upper surface of the unmanned aerial vehicle 30 is suctioned. While the unmanned aerial vehicle 30 is stored, the unmanned aerial vehicle 30 is gripped by the gripping portion 11. For example, the gripping portion 11 may grip the unmanned aerial vehicle 30 by suspending a hook 12 provided on the unmanned aerial vehicle 30. When the unmanned aerial vehicle 30 departs, the gripping portion 11 releases the unmanned aerial vehicle 30. The unmanned aerial vehicle 30 separated from the gripping portion 11 by the release flies in the manhole 100 to perform imaging or the like. The unmanned aerial vehicle 30 that has completed a series of operations such as imaging thrusts toward the suction surface of the main body portion 20 to press the upper surface thereof against the suction surface. In the example of FIG. 1, a suction body 13 is provided in a lower part of the main body portion 20 to form a suction surface. The unmanned aerial vehicle 30 is held by the main body portion 20 when coming into contact with a suction surface which is a surface of the suction body 13. Therefore, with the storage device 10 according to the present embodiment, it is possible to safely perform departure and return operations of the unmanned aerial vehicle 30 without human intervention regardless of whether the unmanned aerial vehicle is under the ground or on the ground, or indoors or outdoors.

(Unmanned Aerial Vehicle)

Figure 2:
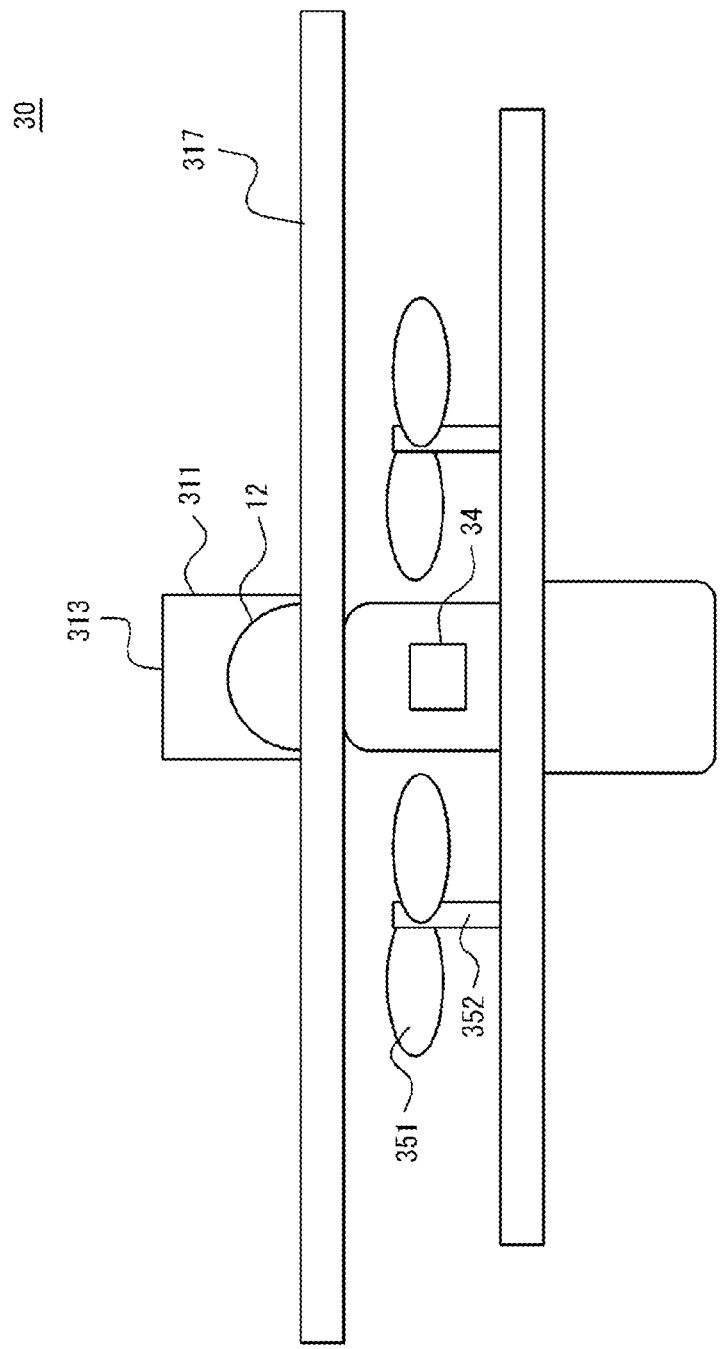
FIG. 2 is a front view illustrating an appearance example of an unmanned aerial vehicle according to the embodiment of the present disclosure.

FIG. 2 is a front view illustrating an appearance example of the unmanned aerial vehicle 30. As illustrated in FIG. 2, the unmanned aerial vehicle 30 includes a control box 311 incorporating a control board, four propellers (rotary blades) 351 pivotally supported by a motor 352, a buffer bumper 317 that absorbs vibration and impact, a camera 34, and a hook 12. The unmanned aerial vehicle 30 may include a plurality of cameras 34. An upper surface 313 of the unmanned aerial vehicle 30 has a suction surface for suctioning to the main body portion 20 of the storage device 10.

Figure 3:
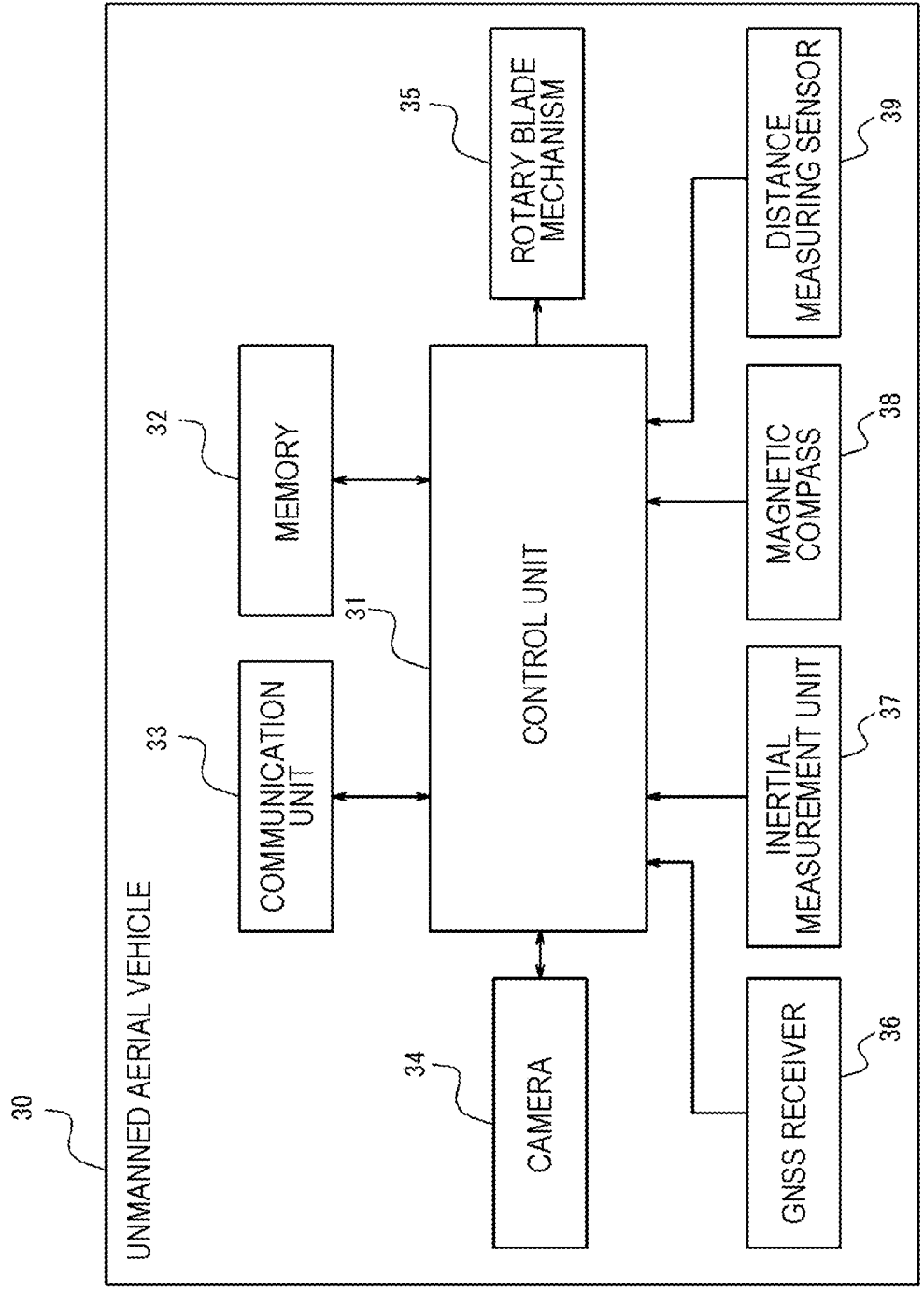
FIG. 3 is a block diagram illustrating an internal configuration example of the unmanned aerial vehicle according to the embodiment of the present disclosure.

FIG. 3 is a block diagram illustrating an internal configuration example of the unmanned aerial vehicle 30. The unmanned aerial vehicle 30 includes a control unit 31, a memory 32, a communication unit 33, a camera 34, a rotary blade mechanism 35, a global navigation satellite system (GNSS) receiver 36, an inertial measurement unit (IMU) 37, a magnetic compass 38, and a distance measuring sensor 39.

The communication unit 33 performs wireless communication with the terminal 50. Examples of the wireless communication method include a wireless LAN such as Wi-Fi (registered trademark) or specified low power radio communication.

The camera 34 captures an image of the surroundings of the unmanned aerial vehicle 30 and generates data of the captured image. The image data of the camera 34 is stored in the memory 32.

The rotary blade mechanism 35 includes a plurality of (for example, four) propellers 351 and a plurality of (for example, four) motors 352 that rotate the plurality of propellers 351.

The GNSS receiver 36 receives a plurality of signals indicating times transmitted from GNSS satellites which are a plurality of navigation satellites and positions (for example, coordinates) of the GNSS satellites. The GNSS receiver 36 calculates the position (that is, the position of the unmanned aerial vehicle 30) of the GNSS receiver 36 on the basis of the plurality of received signals. The GNSS receiver 36 outputs the position information of the unmanned aerial vehicle 30 to the control unit 31.

The inertial measurement unit 37 detects the attitude of the unmanned aerial vehicle 30 and outputs a detection result to the control unit 31. The inertial measurement unit 37 detects, as the attitude of the unmanned aerial vehicle 30, accelerations in three axial directions of forward and rearward, left and right, and up and down of the unmanned aerial vehicle 30, and angular velocities in three axial directions of a pitch axis, a roll axis, and a yaw axis. The inertial measurement unit 37 can be implemented by, for example, a semiconductor sensor capable of measuring slow movement.

The magnetic compass 38 detects a direction of the heading of the unmanned aerial vehicle 30, and outputs a detection result to the control unit 31. The distance measuring sensor 39 detects a distance between the unmanned aerial vehicle 30 and a target object designated by the control unit 31, and outputs a detection result to the control unit 31.

The memory 32 stores computer programs (programs) and the like necessary for the control unit 31 to control the camera 34, the rotary blade mechanism 35, the GNSS receiver 36, the inertial measurement unit 37, the magnetic compass 38, and the distance measuring sensor 39. The memory 32 may be a computer-readable recording medium. The memory 32 may be provided inside the unmanned aerial vehicle 30 or may be provided detachably from the unmanned aerial vehicle 30.

In the present embodiment, the control unit 31 is a processor such as a central processing unit (CPU), a micro processing unit (MPU), a graphics processing unit (GPU), a digital signal processor (DSP), or a system on a chip (SoC), and may be configured by a plurality of processors of the same or different types. The control unit 31 may be configured by dedicated hardware such as an application specific integrated circuit (ASIC), a field-programmable gate array (FPGA), or the like.

The control unit 31 performs signal processing for integrally controlling the operation of each unit of the unmanned aerial vehicle 30, data input/output processing with other units, and data calculation processing. The control unit 31 controls autonomous flight of the unmanned aerial vehicle 30 according to a computer program stored in the memory 32. When autonomously flying, the control unit 31 refers to data such as a flight path and a flight time stored in the memory 32. Note that the control unit 31 may control the flight of the unmanned aerial vehicle 30 in accordance with a command received from the terminal 50 via the communication unit 33.

The control unit 31 acquires and analyzes image data captured by the camera 34 to specify the environment around the unmanned aerial vehicle 30. The control unit 31 controls the flight to avoid an obstacle, for example, on the basis of the environment around the unmanned aerial vehicle 30. The control unit 31 controls the rotary blade mechanism 35 to control the flight of the unmanned aerial vehicle 30. In the flight control, the position including the latitude, longitude, and altitude of the unmanned aerial vehicle 30 is changed.

The program may be recorded in a recording medium readable by the computer (the unmanned aerial vehicle 30). Using such a recording medium makes it possible to install the program in the computer. Here, the recording medium on which the program is recorded may be a non-transitory recording medium. The non-transitory recording medium is not particularly limited, but may be, for example, a CD-ROM, a DVD-ROM, a Universal Serial Bus (USB) memory, or the like. The program may be downloaded from an external device via a network.

(Storage Device)

Figure 4A:
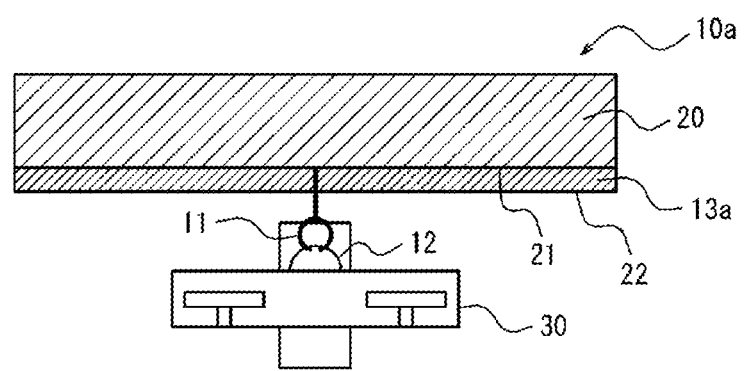
FIG. 4A is a view for describing a state in which the unmanned aerial vehicle takes off and lands by using a storage device according to the embodiment of the present disclosure.
Figure 4B:
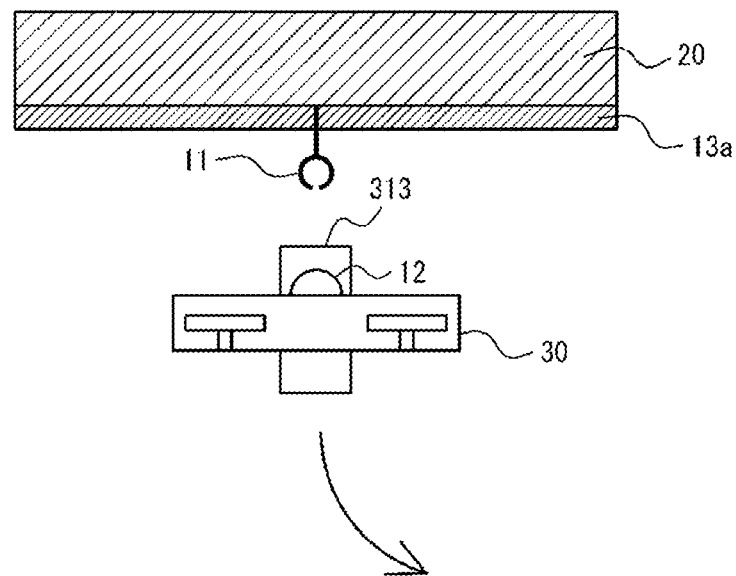
FIG. 4B is a view for describing a state in which the unmanned aerial vehicle takes off and lands by using a storage device according to the embodiment of the present disclosure.
Figure 4C:
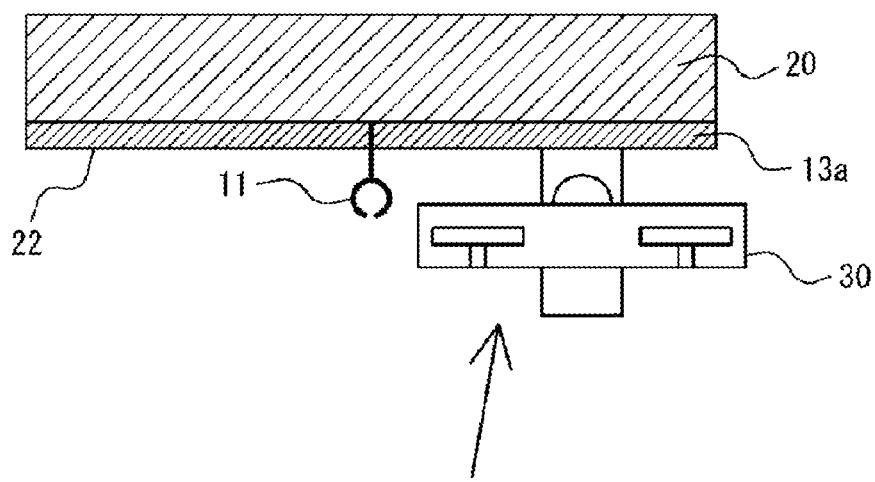
FIG. 4C is a view for describing a state in which the unmanned aerial vehicle takes off and lands by using a storage device according to the embodiment of the present disclosure.

FIGS. 4A to 4C are views for describing a state in which the unmanned aerial vehicle 30 takes off and lands by using a storage device 10a according to the embodiment of the present disclosure. In the storage device 10a illustrated in FIGS. 4A to 4C, a suction body 13a is provided on a lower surface 21 of a main body portion 20 to form a suction surface 22, and the upper surface 313 of the unmanned aerial vehicle 30 can be suctioned to the suction surface 22. A specific configuration example of the suction body 13a will be described later.

In FIG. 4A, a gripping portion 11 of the storage device 10a grips the unmanned aerial vehicle 30 by suspending the hook 12 provided on the unmanned aerial vehicle 30. When the unmanned aerial vehicle 30 departs, as illustrated in FIG. 4B, the gripping portion 11 of the storage device 10a stops the grip of the unmanned aerial vehicle 30 and releases the unmanned aerial vehicle 30. The unmanned aerial vehicle 30 separated from the gripping portion 11 by the release flies in the manhole 100 to perform imaging or the like. As illustrated in FIG. 4C, the unmanned aerial vehicle 30 that has completed a series of operations such as imaging thrusts toward the suction surface 22 of the main body portion 20 to press the upper surface 313 thereof against the suction surface 22. When the upper surface 313 of the unmanned aerial vehicle 30 is pressed against any place of the suction body 13a, the main body portion 20 suctions and holds the unmanned aerial vehicle 30. When the unmanned aerial vehicle 30 is stored in the storage device 10a, the unmanned aerial vehicle 30 does not need to be accurately positioned. In this way, since the storage device 10a has different mechanisms for departure and return of the unmanned aerial vehicle 30, according to the storage device 10a, it is possible to safely perform the inspection without human intervention in the departure and return operations of the inspection by the flight vehicle. In addition, since the main body portion 20 of the storage device 10a can be installed regardless of whether it is under the ground or on the ground, or indoors or outdoors, it is possible to safely perform the departure and return operations of the unmanned aerial vehicle 30 regardless of whether it is under the ground or on the ground, or indoors or outdoors.

Figure 5A:
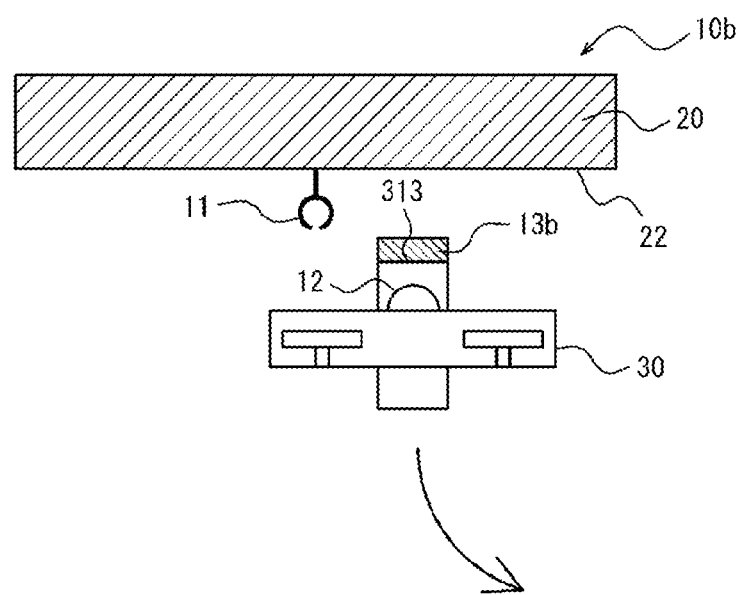
FIG. 5A is a view illustrating a configuration example in which a suction body is provided on an upper surface of the unmanned aerial vehicle.
Figure 5B:
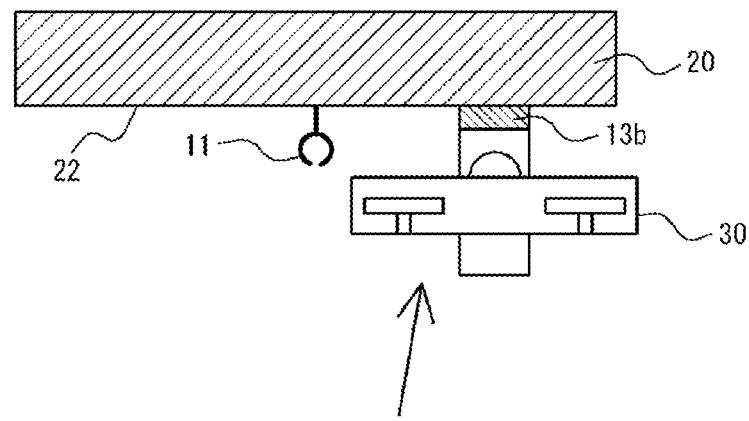
FIG. 5B is a view illustrating a configuration example in which a suction body is provided on the upper surface of the unmanned aerial vehicle.
Figure 6A:
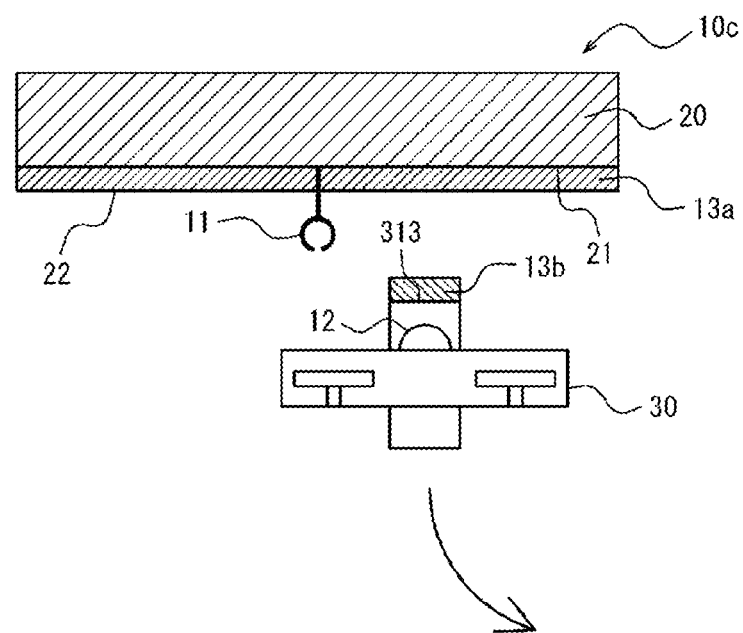
FIG. 6A is a view illustrating a configuration example in which suction bodies are provided on a lower surface of a main body portion of a storage device and the upper surface of the unmanned aerial vehicle.
Figure 6B:
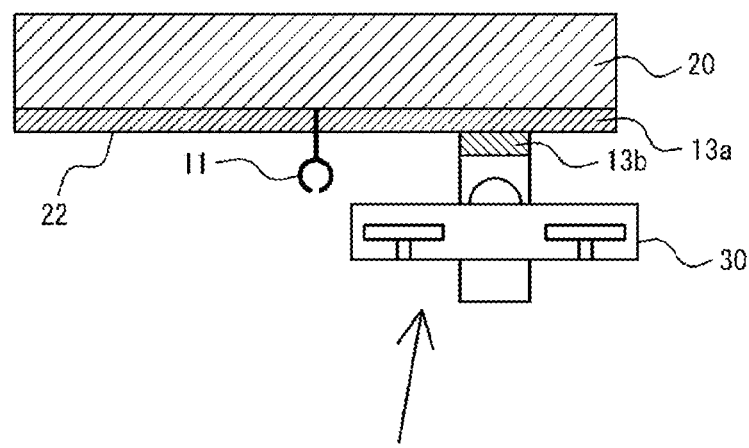
FIG. 6B is a view illustrating a configuration example in which suction bodies are provided on a lower surface of a main body portion of a storage device and the upper surface of the unmanned aerial vehicle.

FIG. 4A illustrates an example in which the suction body 13a is provided on the lower surface 21 of the main body portion 20 of the storage device 10a to form the suction surface 223, but the suction body 13 may be provided on at least one of the lower surface 21 of the main body portion 20 and the upper surface 313 of the unmanned aerial vehicle 30. FIGS. 5A and 5B are diagrams illustrating a configuration example of a storage device 10b in which a suction body 13b is provided on the upper surface 313 of the unmanned aerial vehicle 30. FIG. 5A illustrates a state in which a gripping portion 11 of a main body portion 20 releases the hook 12 of the unmanned aerial vehicle 30 and the unmanned aerial vehicle 30 departs. FIG. 5B illustrates a state in which the unmanned aerial vehicle 30 that has completed a series of operations such as imaging thrusts toward a suction surface 22 of the main body portion 20, whereby the suction body 13b provided on the upper surface 313 thereof is pressed against the suction surface 22 to cause the main body portion 20 to hold the unmanned aerial vehicle 30. FIGS. 6A and 6B are diagrams illustrating a configuration example of a storage device 10c in which suction bodies 13a and 13b are provided on both a lower surface 21 of a main body portion 20 and the upper surface 313 of the unmanned aerial vehicle 30. FIG. 6A illustrates a state in which a gripping portion 11 of the main body portion 20 releases the hook 12 of the unmanned aerial vehicle 30, and the unmanned aerial vehicle 30 departs. FIG. 6B illustrates a state in which the unmanned aerial vehicle 30 thrusts toward a suction surface 22 of the main body portion 20, whereby the suction body 13b provided on the upper surface 313 thereof is pressed against the suction body 13a provided on the main body portion 20 to cause the suction surface 22 of the main body portion 20 to hold the unmanned aerial vehicle 30. In this way, by providing the suction body 13 on at least one of the lower surface 21 of the main body portion 20 and the upper surface 313 of the unmanned aerial vehicle 30, the upper surface 313 of the unmanned aerial vehicle 30 can be pressed against the suction surface 22 to cause the main body portion 20 to hold the unmanned aerial vehicle 30.

Figure 7A:
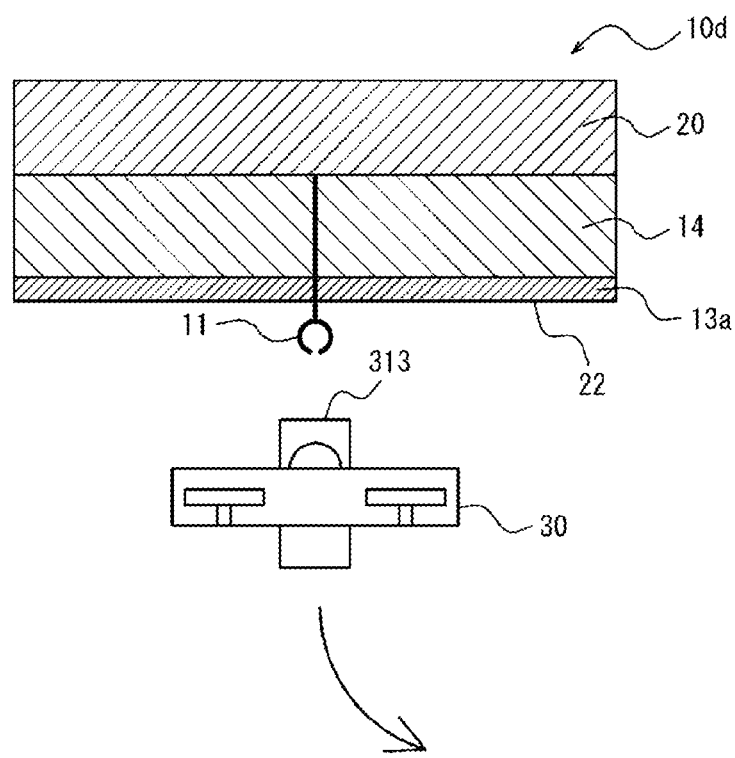
FIG. 7A is a diagram illustrating a configuration example in which an impact absorber is provided between a main body portion and a suction body of a storage device.
Figure 7B:
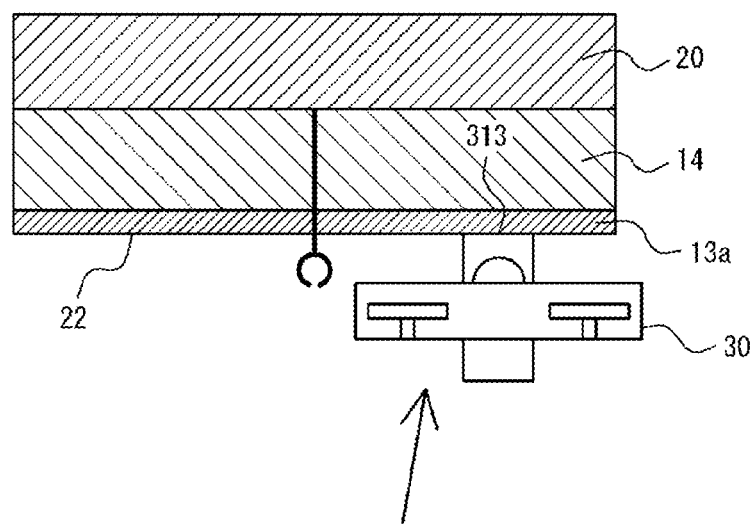
FIG. 7B is a diagram illustrating a configuration example in which an impact absorber is provided between a main body portion and a suction body of a storage device.

FIGS. 4A to 4C illustrate an example in which the suction body 13a is directly provided in the lower part of the main body portion 20, but an impact absorber which is a material for absorbing impact may be provided between the suction body 13a and the main body portion 20. FIGS. 7A and 7B are diagrams illustrating a configuration example in which an impact absorber 14 is provided between a main body portion 20 and a suction body 13a of a storage device 10d. FIG. 7A illustrates a state in which a gripping portion 11 of the main body portion 20 releases the hook 12 of the unmanned aerial vehicle 30, and the unmanned aerial vehicle 30 departs. FIG. 7B illustrates a state in which the unmanned aerial vehicle 30 that has completed a series of operations such as imaging thrusts toward a suction body 13a of the main body portion 20, whereby the upper surface 313 thereof is pressed against the suction body 13a to cause the main body portion 20 to hold the unmanned aerial vehicle 30. Here, even if the unmanned aerial vehicle 30 vigorously collides with the suction body 13a, the impact is alleviated in the impact absorber 14, and it is possible to prevent damage to the main body portion 20 and the unmanned aerial vehicle 30. The material of the impact absorber 14 may be, for example, low-repulsion urethane. The material of the impact absorber 14 is not limited to low-repulsion urethane as long as it can absorb impact, and may be, for example, sponge, rubber, gel, cloth, air cap, paper (for example, corrugated cardboard), expanded polystyrene, or the like.

Note that FIGS. 7A and 7B illustrate an example in which the impact absorber 14 is provided between the main body portion 20 and the suction body 13a, but the suction body 13a and the impact absorber 14 may be formed of gels of the same material, and the suction body 13a and the impact absorber 14 may be integrally implemented. In addition, in a case where the suction body 13b is provided on the upper surface 313 of the unmanned aerial vehicle 30, the impact absorber 14 may also be provided between the upper surface 313 and the suction body 13b to alleviate the impact at the time of collision.

Figure 8A:
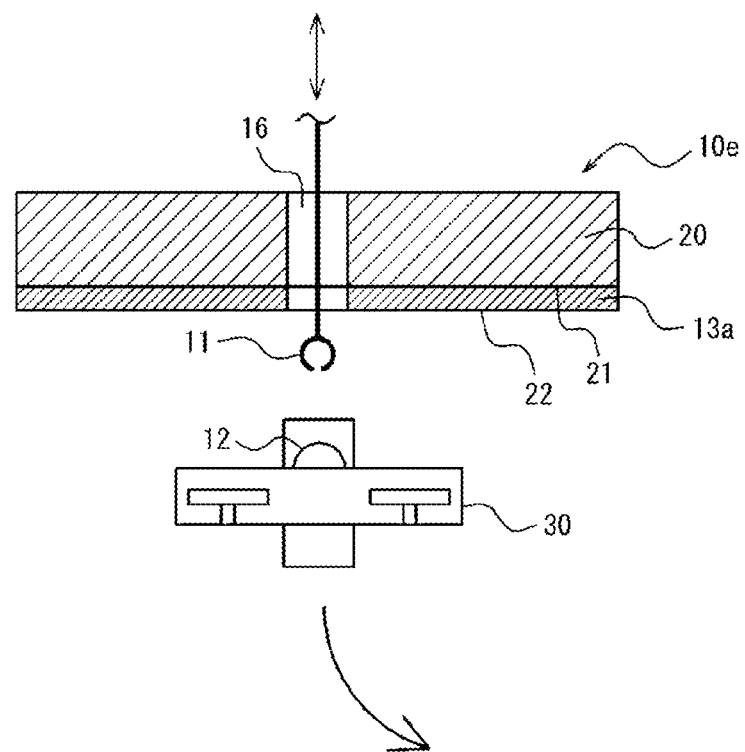
FIG. 8A is a view illustrating a configuration example in which a hole for taking in and out a gripping portion is provided in a main body portion of a storage device.
Figure 8B:
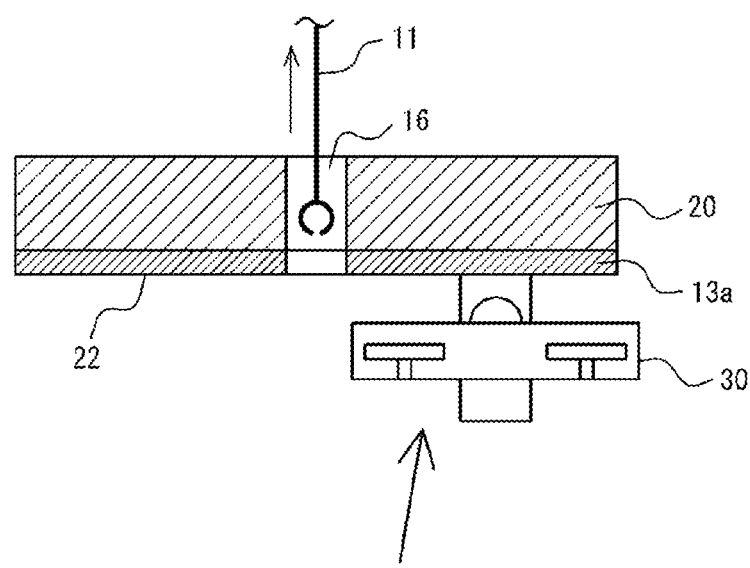
FIG. 8B is a view illustrating a configuration example in which a hole for taking in and out a gripping portion is provided in a main body portion of a storage device.

In the storage device 10 according to the present embodiment, the unmanned aerial vehicle 30 is released from the gripping portion 11 at the time of departure, and is suctioned to the suction surface 22 at the time of returning. Therefore, when the gripping portion 11 protrudes from the main body portion 20 as illustrated in FIGS. 4A to 4C, there is a likelihood that the unmanned aerial vehicle 30 collides with the gripping portion 11 at the time of returning. Therefore, the main body portion 20 may include a hole for taking in and out the gripping portion 11. FIGS. 8A and 8B are views illustrating a configuration example in which a hole 16 for taking in and out a gripping portion 11 is provided in a main body portion 20 of a storage device 10e. FIG. 8A illustrates a state in which the gripping portion 11 of the main body portion 20 releases the hook 12 of the unmanned aerial vehicle 30, and the unmanned aerial vehicle 30 departs. When the unmanned aerial vehicle 30 departs, the gripping portion 11 is pulled up to a position not protruding from the main body portion 20 in the hole 16, and stored inside the surface of the suction body 13a. FIG. 8B illustrates a state in which the unmanned aerial vehicle 30 thrusts toward a suction body 13a of the main body portion 20, whereby the upper surface 313 thereof is pressed against the suction body 13a to cause the main body portion 20 to hold the unmanned aerial vehicle 30. As illustrated in FIG. 8B, since the gripping portion 11 does not protrude from the main body portion 20, the unmanned aerial vehicle 30 does not need to avoid the gripping portion 11 at the time of returning.

(Gripping Portion)

Figure 9A:
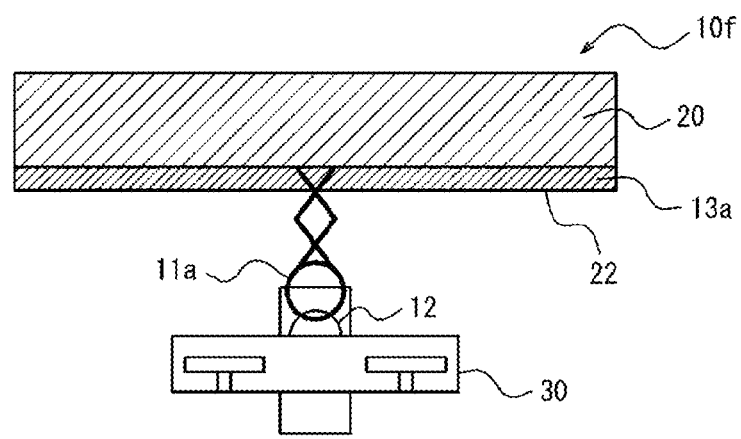
FIG. 9A is a view illustrating a configuration example in which a gripping portion of a storage device has a magic hand structure.
Figure 9B:
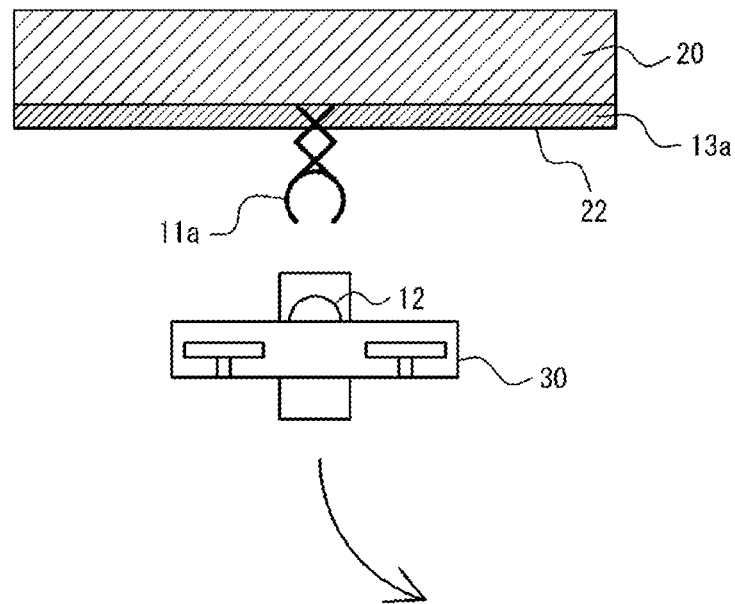
FIG. 9B is a view illustrating a configuration example in which a gripping portion of a storage device has a magic hand structure.
Figure 9C:
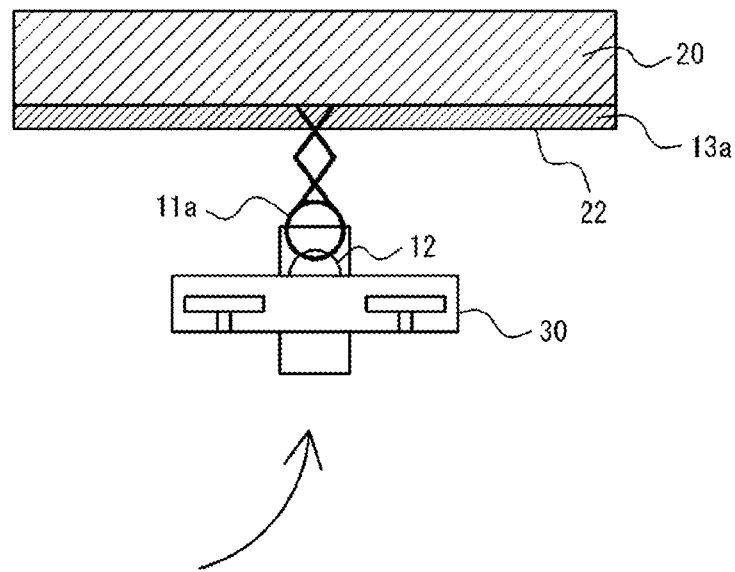
FIG. 9C is a view illustrating a configuration example in which a gripping portion of a storage device has a magic hand structure.

Next, the gripping portion 11 of the storage device 10 will be described. FIGS. 9A to 9C are views illustrating a configuration example in which a gripping portion 11a of a storage device 10f has a magic hand structure. The gripping portion 11a has a structure in which a tip thereof can be opened and closed. FIG. 9A illustrates a state in which the closed gripping portion 11a suspends the hook 12 of the unmanned aerial vehicle 30 and grips the unmanned aerial vehicle 30. FIG. 9B illustrates a state in which the gripping portion 11a is released to release the unmanned aerial vehicle 30 and the unmanned aerial vehicle 30 departs. FIG. 9C illustrates a state in which the gripping portion 11a grips and catches the returned unmanned aerial vehicle 30 again and stores the unmanned aerial vehicle 30. Note that the unmanned aerial vehicle 30 may cause the main body portion 20 to hold the unmanned aerial vehicle 30 by bringing the upper surface 313 thereof into contact with the suction body 13a.

Figure 10A:
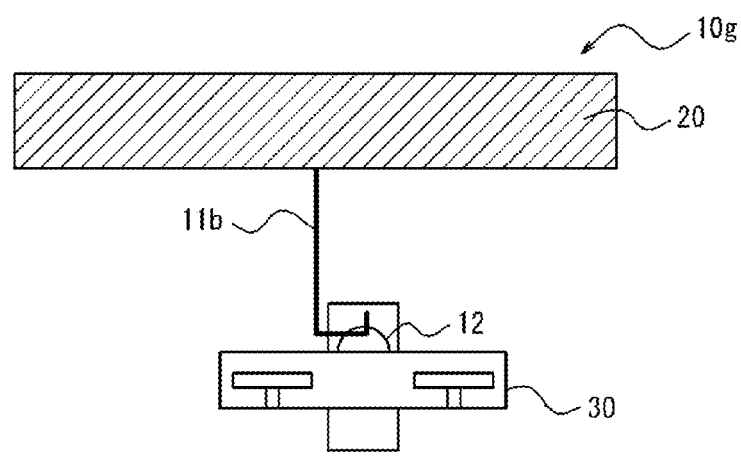
FIG. 10A is a view illustrating a configuration example in which a gripping portion of a storage device has a hook structure.
Figure 10B:
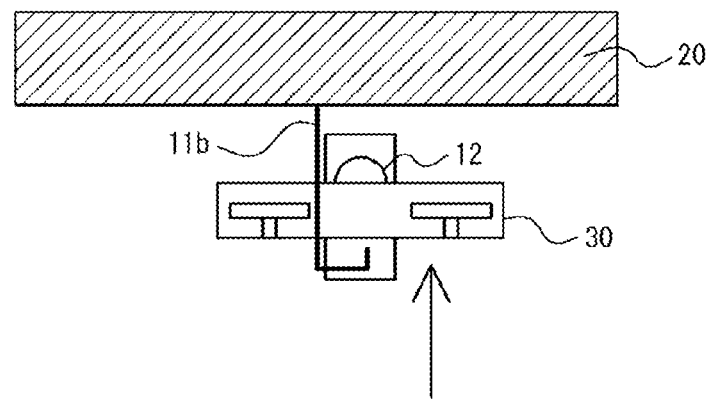
FIG. 10B is a view illustrating a configuration example in which a gripping portion of a storage device has a hook structure.
Figure 10C:
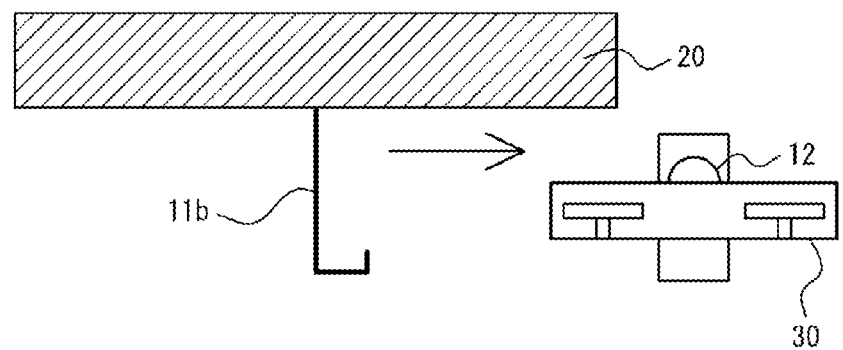
FIG. 10C is a view illustrating a configuration example in which a gripping portion of a storage device has a hook structure.

FIGS. 10A to 10C are views illustrating a configuration example in which a gripping portion 11b of a storage device 11g has a hook structure. The gripping portion 11b has a hook structure of a key type. FIG. 10A illustrates a state in which the hook 12 of the unmanned aerial vehicle 30 is suspended on a key portion of the gripping portion 11b to grip the unmanned aerial vehicle 30. In a case where the gripping portion has a hook structure of a key type like the gripping portion 11b, the unmanned aerial vehicle 30 temporarily ascends and further slides sideways to depart after removing the hook 12 from the gripping portion 11b. FIG. 10B illustrates a state in which the unmanned aerial vehicle 30 ascends. FIG. 10C illustrates a state in which the unmanned aerial vehicle 30 that has ascended slides sideways. With such a series of operations, the unmanned aerial vehicle 30 can depart after removing the hook 12 from the gripping portion 11b. Note that, at the time of returning, the unmanned aerial vehicle 30 causes the main body portion 20 to hold the unmanned aerial vehicle 30 by bringing the upper surface 313 thereof into contact with the suction body 13a, but the hook 12 may be suspended on the gripping portion 11b again.

Figure 11A:
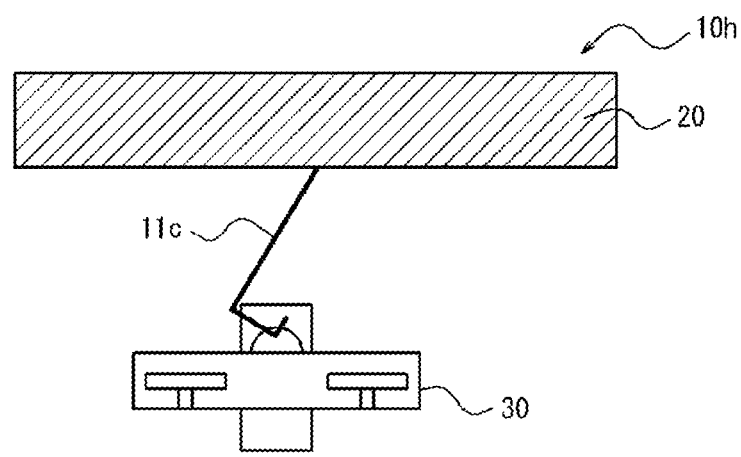
FIG. 11A is a view illustrating a configuration example in which a gripping portion of a storage device has an oblique hook structure.
Figure 11B:
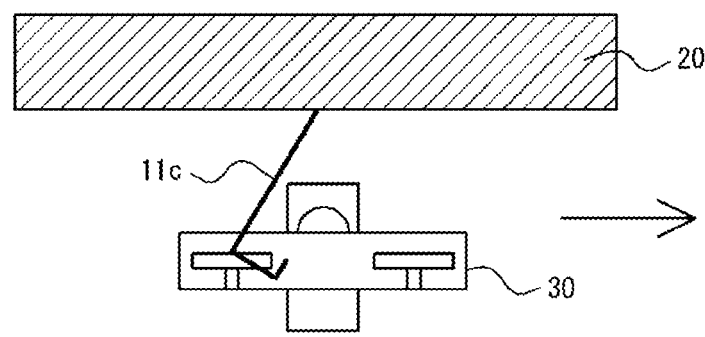
FIG. 11B is a view illustrating a configuration example in which a gripping portion of a storage device has an oblique hook structure.

FIGS. 11A and 11B are views illustrating a configuration example in which a gripping portion 11c of a storage device 10h has an oblique hook structure. FIG. 11A illustrates a state in which the hook 12 of the unmanned aerial vehicle 30 is suspended on a key portion of the gripping portion 11c to grip the unmanned aerial vehicle 30. In a case where the gripping portion has an oblique hook structure like the gripping portion 11c, the unmanned aerial vehicle 30 can depart from the gripping portion 11c with the hook 12 removed only by ascending. FIG. 11B illustrates a state in which the unmanned aerial vehicle 30 ascends and the hook 12 is removed from the gripping portion 11c. Note that, at the time of returning, the unmanned aerial vehicle 30 causes the main body portion 20 to hold the unmanned aerial vehicle 30 by bringing the upper surface 313 thereof into contact with the suction body 13a, but the hook 12 may be suspended on the gripping portion 11c again.

Figure 12A:
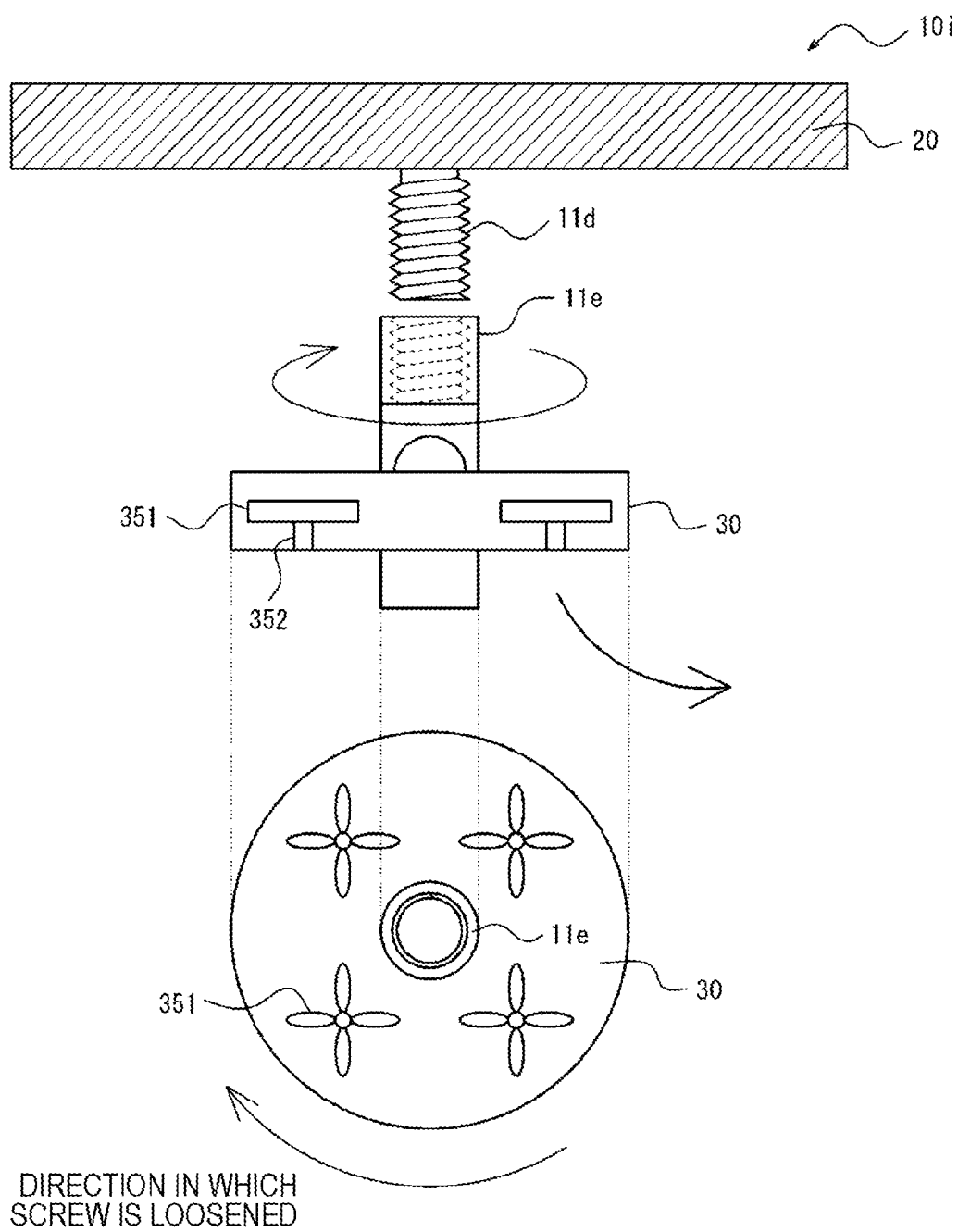
FIG. 12A is a view illustrating a configuration example in which a gripping portion of a storage device has a screw structure.
Figure 12B:
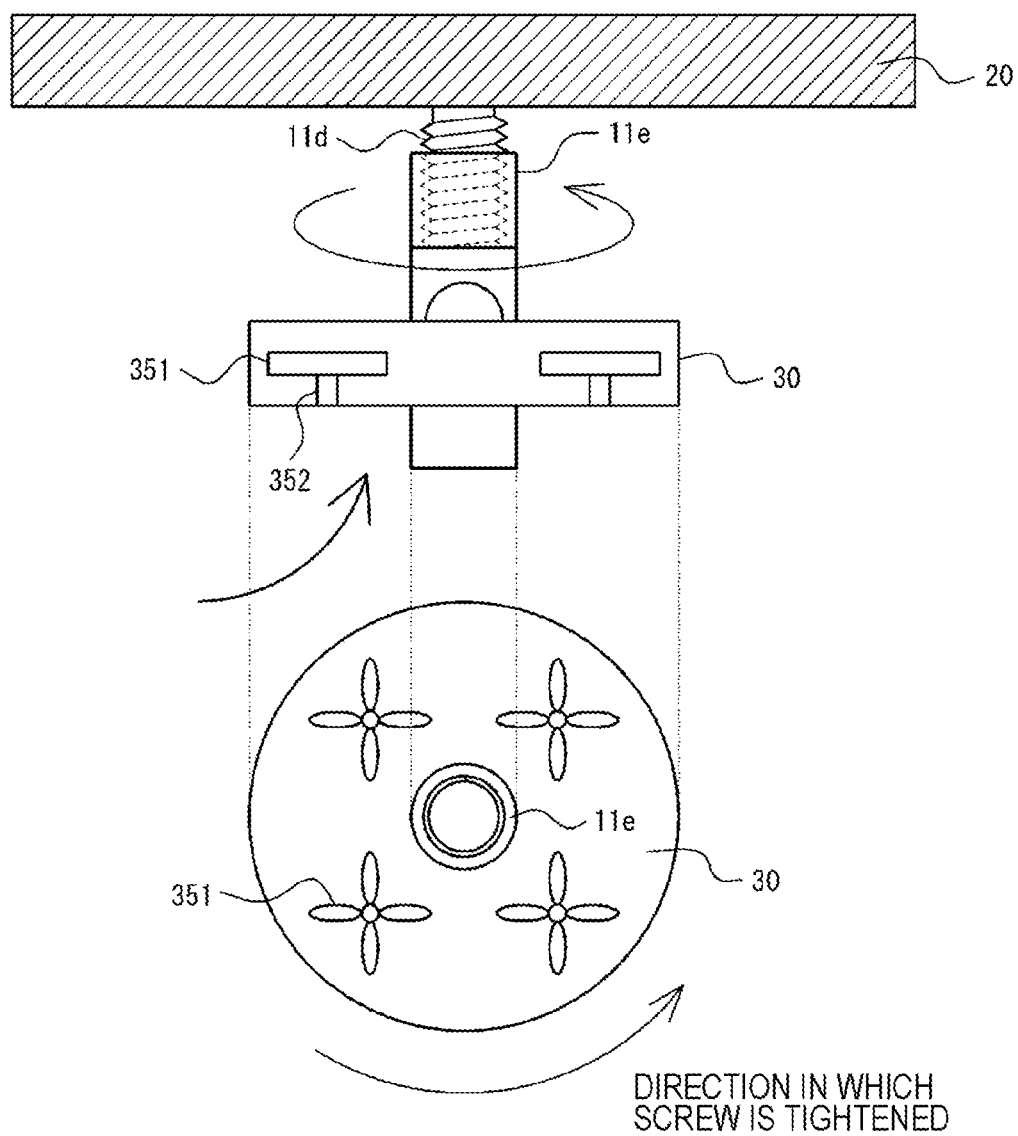
FIG. 12B is a view illustrating a configuration example in which a gripping portion of a storage device has a screw structure.

FIGS. 12A and 12B are views illustrating a configuration example in which a gripping portion 11 of a storage device 10i has a screw structure, and illustrate a front view and a top view of the storage device 10i, respectively. In the storage device 10i, a male screw 11d and a female screw 11e engaged with each other are provided on a main body portion 20 and the upper surface of the unmanned aerial vehicle 30, and the gripping portion 11 grips the unmanned aerial vehicle 30 by tightening the screws. FIGS. 12A and 12B illustrate an example in which the male screw 11d is provided in the lower part of the main body portion 20 and the female screw 11e is provided in the upper part of the unmanned aerial vehicle 30. However, the female screw 11e may be provided in the lower part of the main body portion 20 and the male screw 11d may be provided in the upper part of the unmanned aerial vehicle 30.

FIG. 12A illustrates a state in which the unmanned aerial vehicle 30 departs from the storage device 10i. In FIG. 12A, the unmanned aerial vehicle 30 performs yaw rotation in a direction of loosening the screws. When the male screw 11d and the female screw 11e are removed by the rotation, the unmanned aerial vehicle 30 departs. FIG. 12B illustrates a state in which the unmanned aerial vehicle 30 returns to the storage device 10i. In FIG. 12B, the unmanned aerial vehicle 30 performs yaw rotation in a direction in which the screw is tightened. Accordingly, the unmanned aerial vehicle 30 is fixed to the main body portion 20 of the storage device 10. Note that the unmanned aerial vehicle 30 may cause the main body portion 20 to hold the unmanned aerial vehicle 30 by bringing the upper surface 313 thereof into contact with a suction body 13a (not illustrated). In addition, by increasing the pitch of the male screw 11d and the female screw 11e, the unmanned aerial vehicle 30 can depart by removing the screws with a small rotation speed. Furthermore, the main body portion 20 may be configured to automatically loosen or tighten the screw by rotating the male screw 11d while the unmanned aerial vehicle 30 is fixed.

Figure 13A:
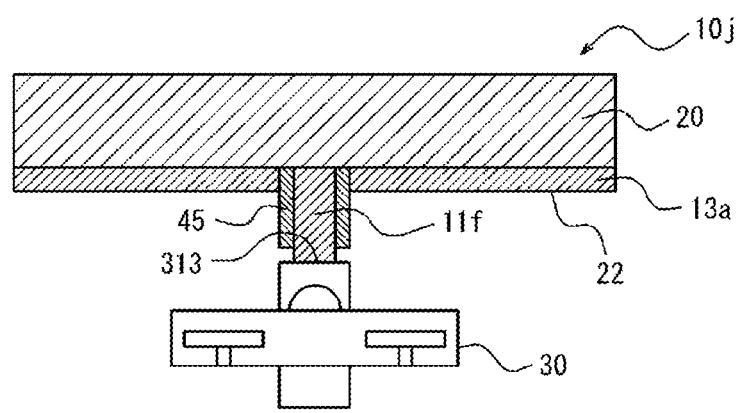
FIG. 13A is a view illustrating a configuration example in which a gripping portion of a storage device includes a suction body.
Figure 13B:
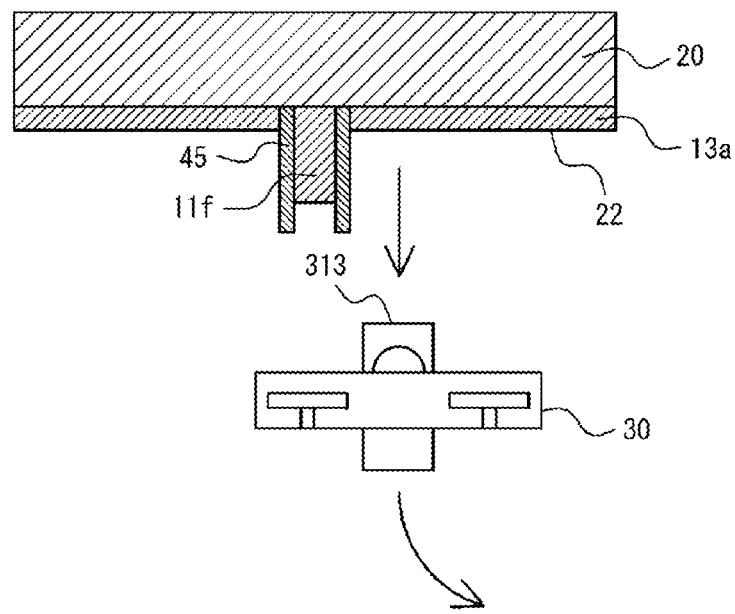
FIG. 13B is a view illustrating a configuration example in which a gripping portion of a storage device includes a suction body.
Figure 13C:
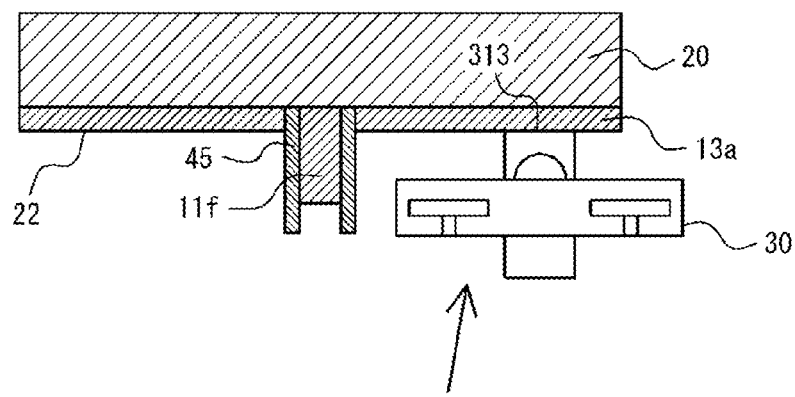
FIG. 13C is a view illustrating a configuration example in which a gripping portion of a storage device includes a suction body.

FIGS. 13A to 13C is views illustrating a configuration example in which a gripping portion 11f of a storage device 10j includes a suction body. FIG. 13A illustrates a state in which the gripping portion 11f formed of the suction body comes into contact with the upper surface 313 of the unmanned aerial vehicle 30 to grip the unmanned aerial vehicle 30. As illustrated in FIG. 13A, the side surface of the gripping portion 11f is covered with a cylinder 45. In a state where the gripping portion 11f grips the unmanned aerial vehicle 30, "length of cylinder 45"<"length of gripping portion 11f" is satisfied. The gripping portion 11f releases the unmanned aerial vehicle 30 by pushing out the unmanned aerial vehicle 30 with the cylinder 45. FIG. 13B illustrates a state in which the unmanned aerial vehicle 30 is pushed out and released with the cylinder 45. In the released state, "length of cylinder 45">"length of gripping portion 11f" is satisfied. FIG. 13C illustrates a state in which the unmanned aerial vehicle 30 thrusts toward a suction body 13a of the main body portion 20, whereby the upper surface 313 thereof is pressed against the gripping portion 11f to cause the main body portion 20 to hold the unmanned aerial vehicle 30. Note that the mechanism for pushing out the unmanned aerial vehicle 30 is not limited to one using the cylinder 45, and may be implemented by using, for example, a spring. A specific configuration of the suction body included in the gripping portion 11f will be described later.

(Suction Body)

Next, the suction body 13 provided on at least one of the lower surface 21 of the main body portion 20 and the upper surface 313 of the unmanned aerial vehicle 30 will be described. The suction body included in the gripping portion 11f can also be implemented in the same manner as the suction body 13. The suction body 13 may be an adhesive body implemented by a gel-like organic material. Specific examples of the gel-like organic material include natural rubber-based adhesives, starch-based adhesives, natural rubber latex adhesives, resins, glue, bonds, water glass, asphalt, and lacquer. However, since the number of components can be reduced and the cost is low, it is desirable to use an olefin-based or styrene-based resin used for an anti-vibration mat as the adhesive body used for the suction body 13.

Figure 14A:
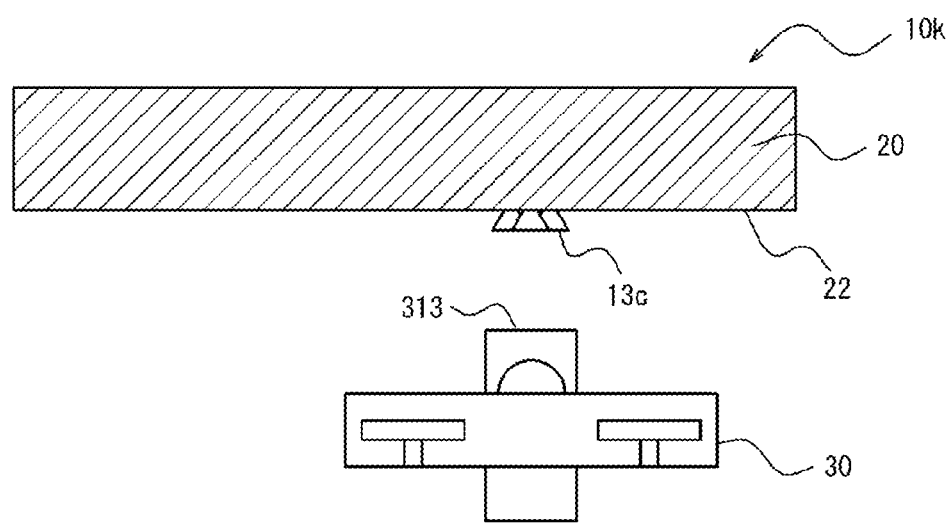
FIG. 14A is a view illustrating a configuration example in which the upper surface of the unmanned aerial vehicle is suctioned to a lower surface of a main body portion of a storage device by a suction cup.
Figure 14B:
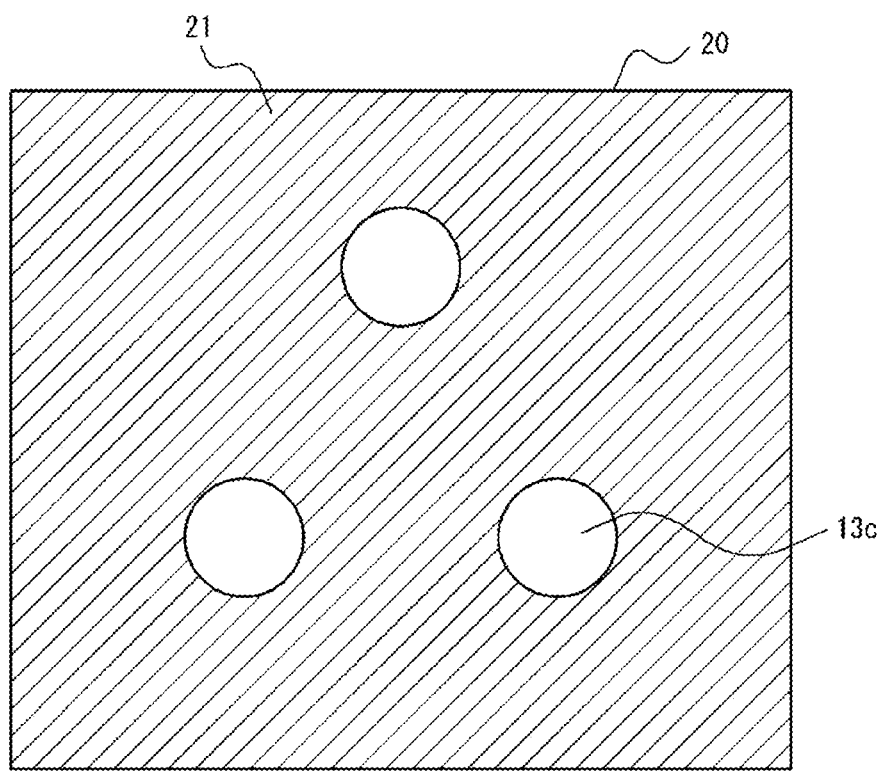
FIG. 14B is a view illustrating a configuration example in which the upper surface of the unmanned aerial vehicle is suctioned to a lower surface of a main body portion of a storage device by a suction cup.
Figure 14C:
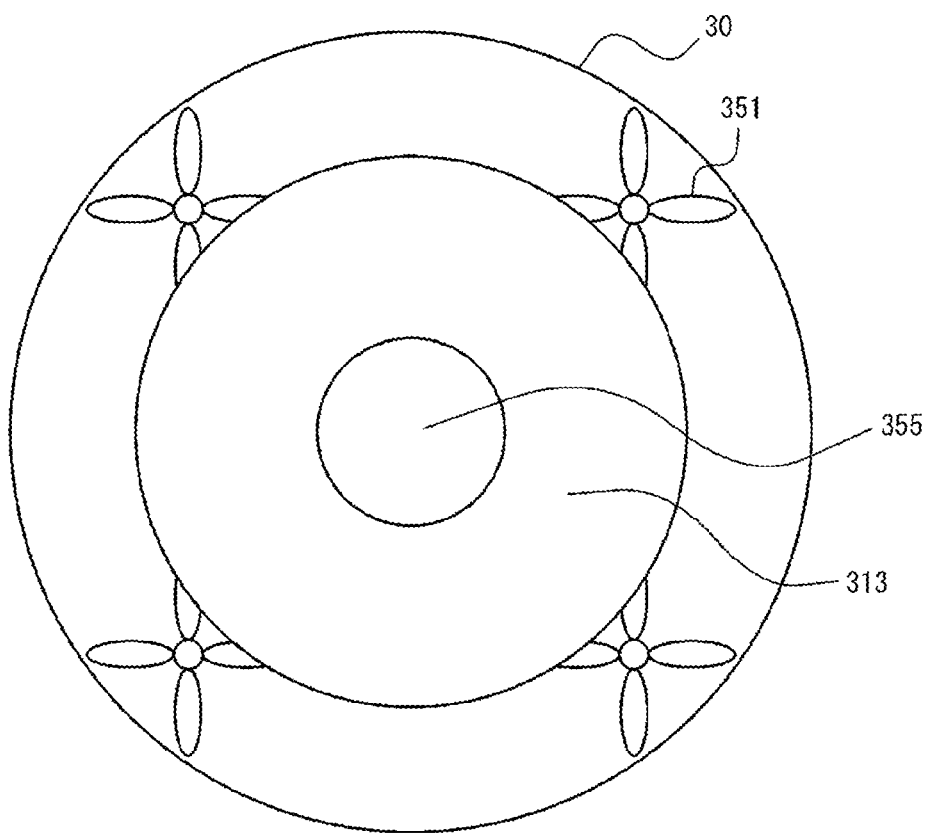
FIG. 14C is a view illustrating a configuration example in which the upper surface of the unmanned aerial vehicle is suctioned to a lower surface of a main body portion of a storage device by a suction cup.
Figure 14D:
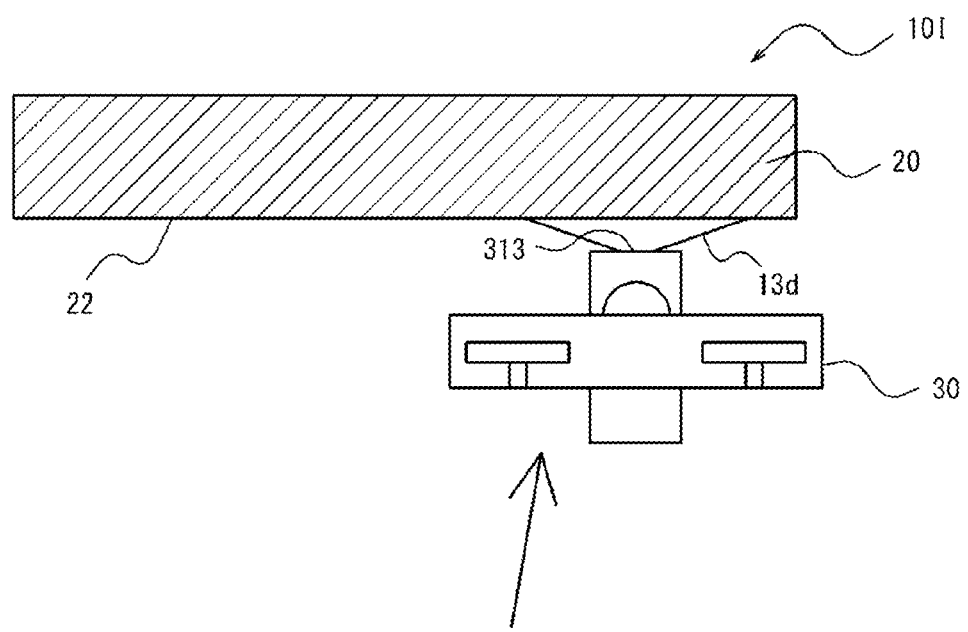
FIG. 14D is a view illustrating a configuration example in which the upper surface of the unmanned aerial vehicle is suctioned to a lower surface of a main body portion of a storage device by a suction cup.

Also, the suction body 13 may be implemented by a suction cup. FIGS. 14A to 14D are views illustrating a configuration example in which the upper surface 313 of the unmanned aerial vehicle 30 is suctioned by a suction cup 13c to a suction surface 22 which is the lower surface of a main body portion 20 of each of storage devices 10k and 10l. FIG. 14A is a front view of the main body portion 20 of the storage device 10k, and FIG. 14B is a bottom view of the main body portion 20 of the storage device 10k. When the suction cup 13c is provided on the suction surface 22 of the main body portion 20 of the storage device 10k, a plurality of suction cups 13c are provided. However, in order to stably support the airframe of the unmanned aerial vehicle 30 on the surface, it is necessary to perform suction with three or more suction cups. Therefore, FIGS. 14A and 14B illustrate three suction cups 13c as the suction body 13 for simplification of description. FIG. 14C is a top view of the unmanned aerial vehicle 30. As illustrated in FIG. 14C, when the unmanned aerial vehicle 30 is viewed from above, an opening 355 through which the gripping portion 11 passes, the upper surface 313, the propeller 351, and the like are observed. When the upper surface 313 of the unmanned aerial vehicle 30 ascends and is pressed against the suction cup 14C, the unmanned aerial vehicle 30 is fixed to the suction cup 14C. A suction cup 13d may be provided on the upper surface 313 of the unmanned aerial vehicle 30 as illustrated in FIG. 14D instead of the suction surface 22 of the main body portion 20. In this case, in order to reduce the weight of the unmanned aerial vehicle 30, the number of the suction cups 13d provided in the unmanned aerial vehicle 30 may be one.

Figure 15A:
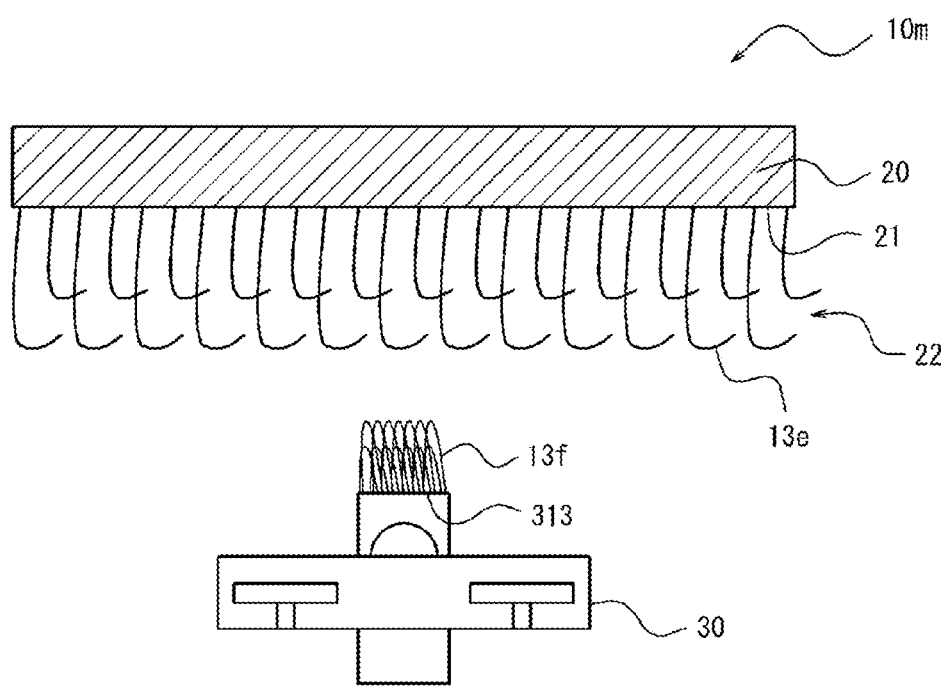
FIG. 15A is a view illustrating a configuration example in which the upper surface of the unmanned aerial vehicle is suctioned to a lower surface of a main body portion of a storage device by hook-and-loop fasteners.
Figure 15B:
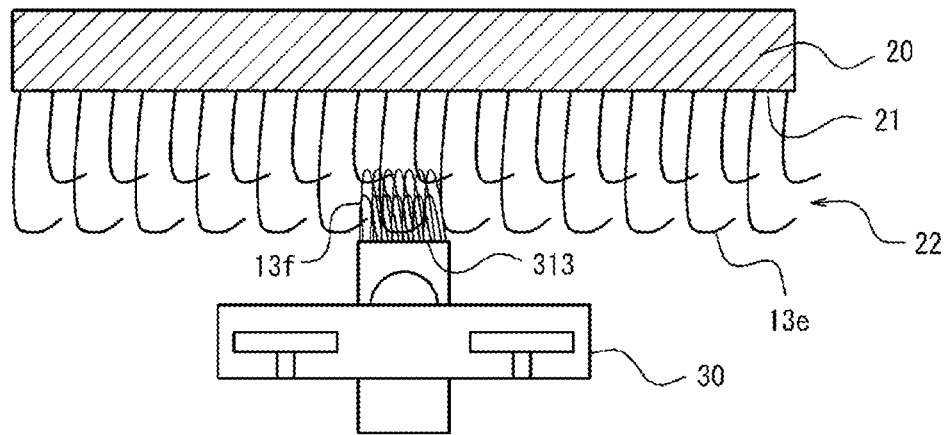
FIG. 15B is a view illustrating a configuration example in which the upper surface of the unmanned aerial vehicle is suctioned to a lower surface of a main body portion of a storage device by hook-and-loop fasteners.

Further, the suction body 13 may be implemented by a hook-and-loop fastener. FIGS. 15A and 15B are views illustrating a configuration example in which the upper surface 313 of the unmanned aerial vehicle 30 is suctioned to a lower surface 21 of a main body portion 20 of a storage device 10m by hook-and-loop fasteners 13e and 13f. FIG. 15A illustrates a state in which the unmanned aerial vehicle 30 departs from the storage device 10m. The hook-and-loop fastener 13e of the hook (male) may be provided on the suction surface 22 of the main body portion 20, and the hook-and-loop fastener 13f of the loop (female) may be provided on the upper surface 313 of the unmanned aerial vehicle 30. This is because there is a high likelihood that the unmanned aerial vehicle 30 side comes into contact with dust, other objects, or the like due to movement in the air. If the hook-and-loop fastener 13e of the hook is provided in the unmanned aerial vehicle 30, there is a high risk that dust during flight gets caught or another object is caught. FIG. 15B illustrates a state in which the unmanned aerial vehicle 30 returns to the storage device 10m. FIG. 15B illustrates a state in which the unmanned aerial vehicle 30 thrusts toward the suction surface 22 of the main body portion 20, whereby the hook-and-loop fasteners 13e and 13f are entangled and the unmanned aerial vehicle 30 is fixed to the main body portion 20.

Figure 16A:
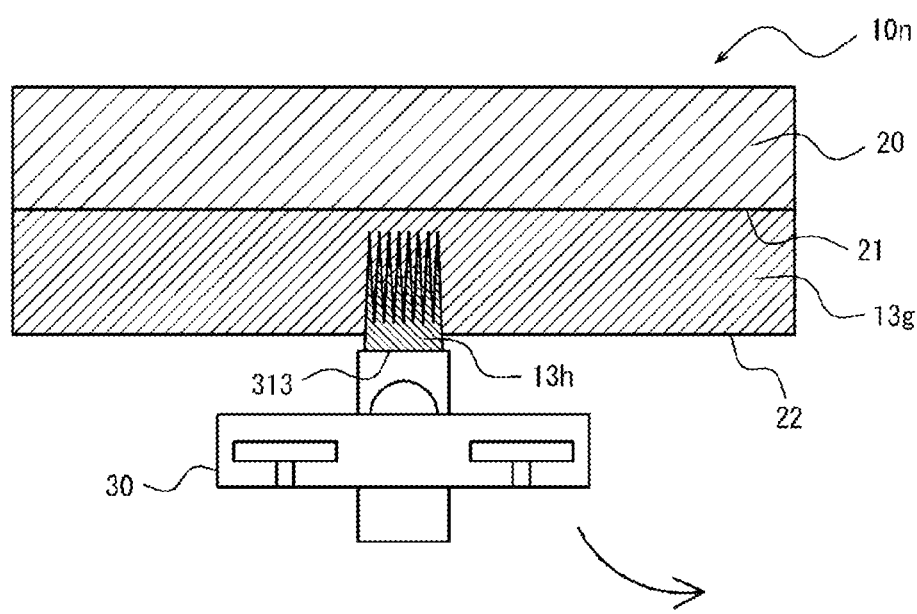
FIG. 16A is a view illustrating a configuration example in which the upper surface of the unmanned aerial vehicle is suctioned to a lower surface of a main body portion of a storage device by needles.
Figure 16B:
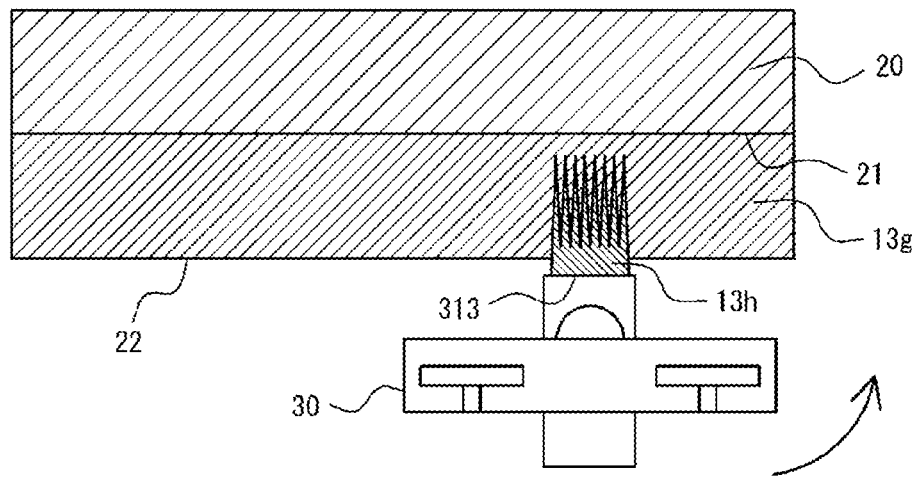
FIG. 16B is a view illustrating a configuration example in which the upper surface of the unmanned aerial vehicle is suctioned to a lower surface of a main body portion of a storage device by needles.

Further, the suction body 13 may be implemented by a needle. FIGS. 16A to 16D are views illustrating a configuration example in which the upper surface 313 of the unmanned aerial vehicle 30 is suctioned to a lower surface 21 of a main body portion 20 of each of storage devices 10n and 10o by needles 13h and 13i. In the example of FIG. 16A, the needle 13h is provided on the upper surface 313 of the unmanned aerial vehicle 30. The needle 13h is a collection of a large number of needles like a mountain of a flower arrangement. The lower surface 21 of the main body portion 20 is provided with a resin 13g into which the needle 13h can be inserted, and a suction surface 22 is formed. In FIGS. 16A and 16B, the needles 13h and 13i are used when the unmanned aerial vehicle 30 departs and returns. As illustrated in FIG. 16A, in a state where the needle 13h is stuck into the resin 13g, the unmanned aerial vehicle 30 is fixed to the main body portion 20 side. When the lift for moving the unmanned aerial vehicle 30 downward acts by driving the propeller 351, the needle 13h is separated from the resin 13g, and the unmanned aerial vehicle 30 departs. When the flying unmanned aerial vehicle 30 moves upward and presses the needle 13h against the resin 13g, the needle 13h is stuck into the resin 13g and the unmanned aerial vehicle 30 is fixed to the main body portion 20. Materials, configurations, and the like of the needle 13h and the resin 13g are selected so that the unmanned aerial vehicle 30 can be fixed and the needle 13h can be attached and detached. Note that a cylinder for separating the unmanned aerial vehicle 30 from the main body portion 20 when the unmanned aerial vehicle 30 departs may be provided.

Figure 16C:
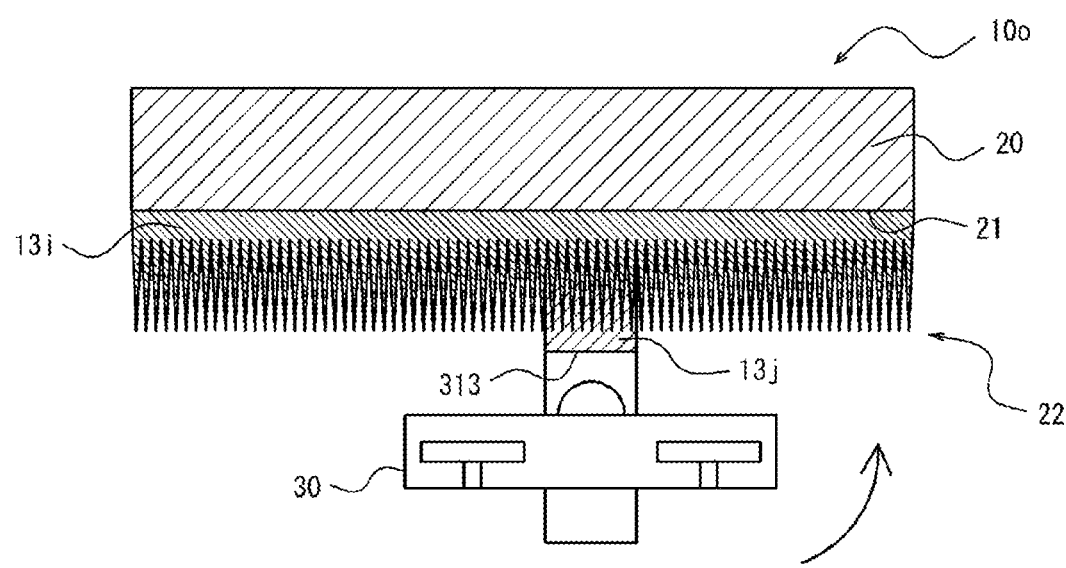
FIG. 16C is a view illustrating a configuration example in which the upper surface of the unmanned aerial vehicle is suctioned to a lower surface of a main body portion of a storage device by needles.
Figure 16D:
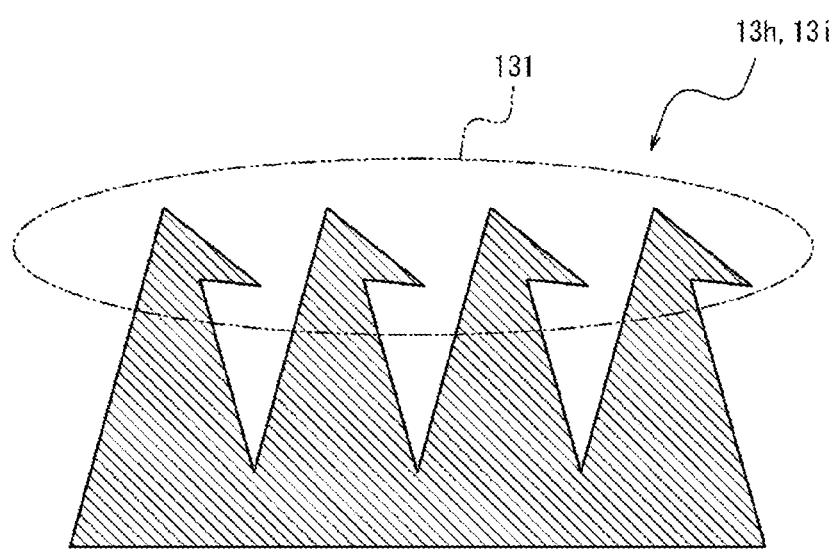
FIG. 16D is a view illustrating a configuration example in which the upper surface of the unmanned aerial vehicle is suctioned to a lower surface of a main body portion of a storage device by needles.

FIGS. 16A and 16B illustrate an example in which the needle 13h is provided on the upper surface 313 of the unmanned aerial vehicle 30 and the resin 13g is provided on the lower surface 21 of the main body portion 20. However, as illustrated in FIG. 16C, the resin 13j may be provided on the upper surface 313 of the unmanned aerial vehicle 30 and the needle 13i may be provided on the lower surface 21 of the main body portion 20. As illustrated in FIG. 16D, keys (barbs) 131 may be provided at the tips of the needles 13h and 13i. Accordingly, the needles 13h and 13i can be made difficult to come off from the resins 13g and 13j.

Figure 17A:
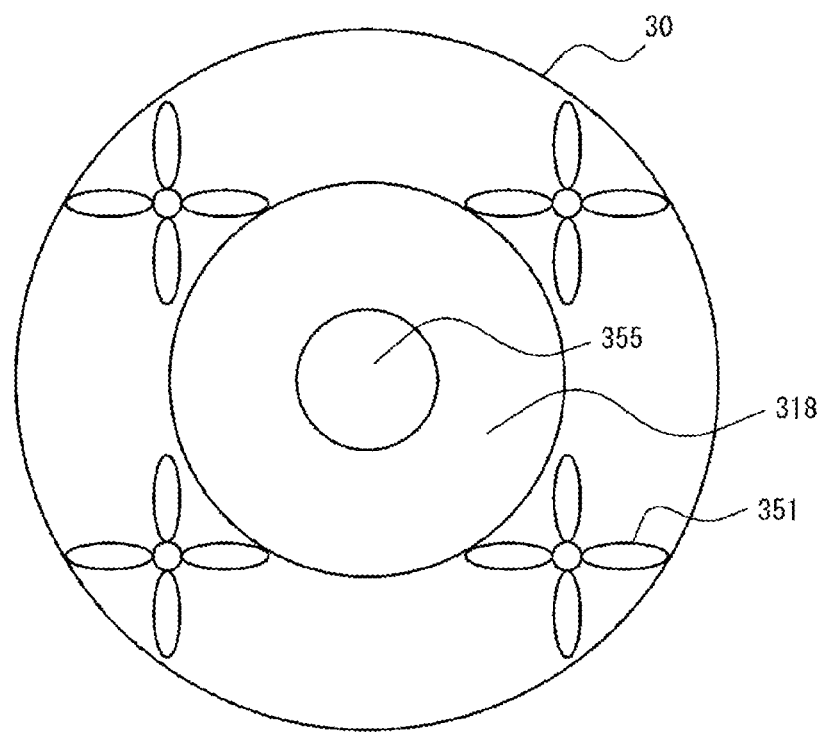
FIG. 17A is a view illustrating a configuration example in which the upper surface of the unmanned aerial vehicle is suctioned to a lower surface of a main body portion of a storage device due to a negative pressure in the unmanned aerial vehicle.
Figure 17B:
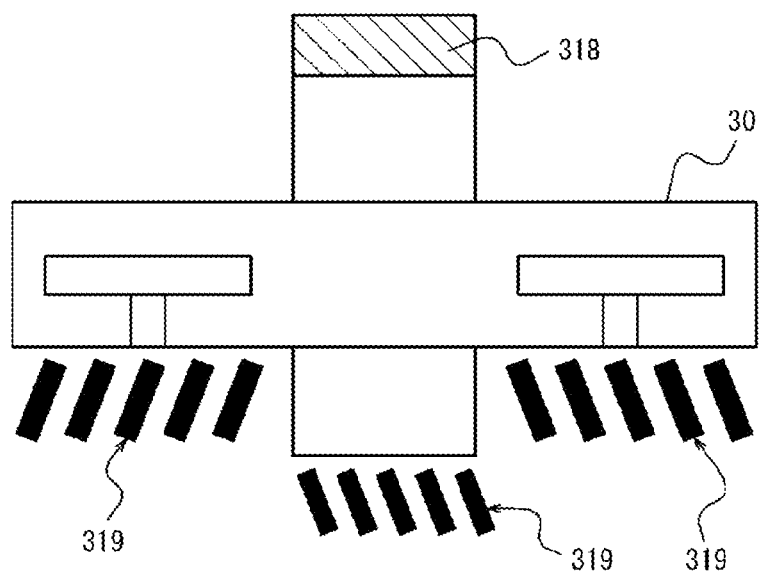
FIG. 17B is a view illustrating a configuration example in which the upper surface of the unmanned aerial vehicle is suctioned to a lower surface of a main body portion of a storage device due to a negative pressure in the unmanned aerial vehicle.

Further, the suction of the unmanned aerial vehicle 30 to the main body portion 20 may be implemented by a negative pressure. That is, the housing of the unmanned aerial vehicle 30 may have a sealed structure in which airtightness is maintained, and after the air pressure in the unmanned aerial vehicle 30 is lowered below the external air pressure, the opening 355 of the housing of the unmanned aerial vehicle 30 may be brought into contact with the suction surface 22 of the main body portion 20 to be suctioned to the main body portion 20 of the unmanned aerial vehicle 30. FIGS. 17A to 17D are views illustrating a configuration example in which the upper surface 313 of the unmanned aerial vehicle 30 is suctioned to a suction surface 23 of a lower surface 21 of a main body portion 20 of a storage device 10p due to a negative pressure in the unmanned aerial vehicle 30. FIG. 17A is a top view of the unmanned aerial vehicle 30, and FIG. 17B is a front view of the unmanned aerial vehicle 30.

A circumferential rubber member 318 and an opening 355 are provided on the upper surface of the unmanned aerial vehicle 30. Side surface guards of the unmanned aerial vehicle 30 are planar and have a sealed structure that maintains airtightness. Louver-shaped valves 319 are provided below the unmanned aerial vehicle 30, and the inside of the unmanned aerial vehicle 30 is sealed when the valve 319 is closed. When the valve 319 is open, there is a relationship of external air pressure $P_0$=aircraft internal pressure $P_1$.

Figure 17C:
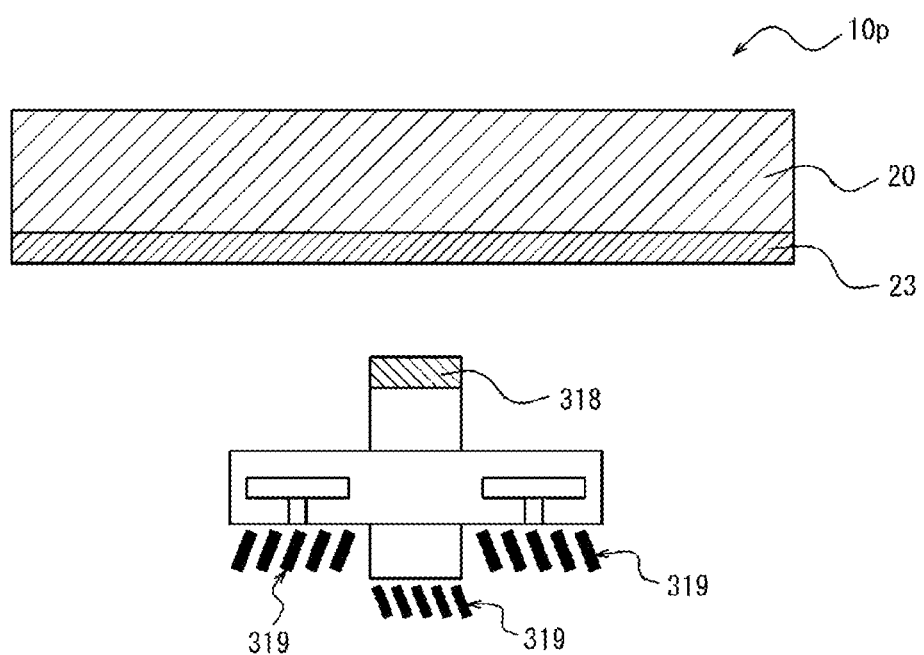
FIG. 17C is a view illustrating a configuration example in which the upper surface of the unmanned aerial vehicle is suctioned to a lower surface of a main body portion of a storage device due to a negative pressure in the unmanned aerial vehicle.
Figure 17D:
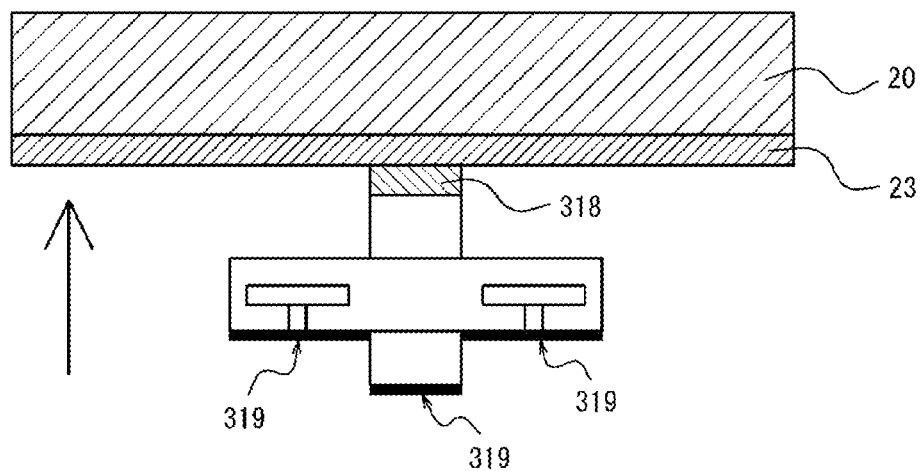
FIG. 17D is a view illustrating a configuration example in which the upper surface of the unmanned aerial vehicle is suctioned to a lower surface of a main body portion of a storage device due to a negative pressure in the unmanned aerial vehicle.

FIG. 17C is a side view of the storage device 10p. A specular and flat suction surface 23 is provided in a lower part of the main body portion 20 in order to bring the unmanned aerial vehicle 30 into close contact with the main body portion. As illustrated in FIG. 17D, the unmanned aerial vehicle 30 sticks to the suction surface 23 of the main body portion 20 at the time of returning, stops the rotation of the propeller 351, and closes the louver-shaped valves 319 at the same time. Since the air inside the unmanned aerial vehicle 30 is exhausted by the propeller 351 until the valve 319 is closed, when the valve 319 is closed and sealed, the inside of the unmanned aerial vehicle 30 has a negative pressure, and external air pressure $P_0$>aircraft internal pressure $P_1$ is satisfied. Accordingly, the rubber member 318 of the unmanned aerial vehicle 30 is attached to the suction surface 23, and the unmanned aerial vehicle 30 is fixed to the main body portion 20. The material of the member 318 of the unmanned aerial vehicle 30 is not limited to rubber. The material of the member 318 may be a vinyl material, a silicon material, or the like as long as it can maintain sealability without exchanging air with the outside.

(Operation Flow)

Figure 18A:
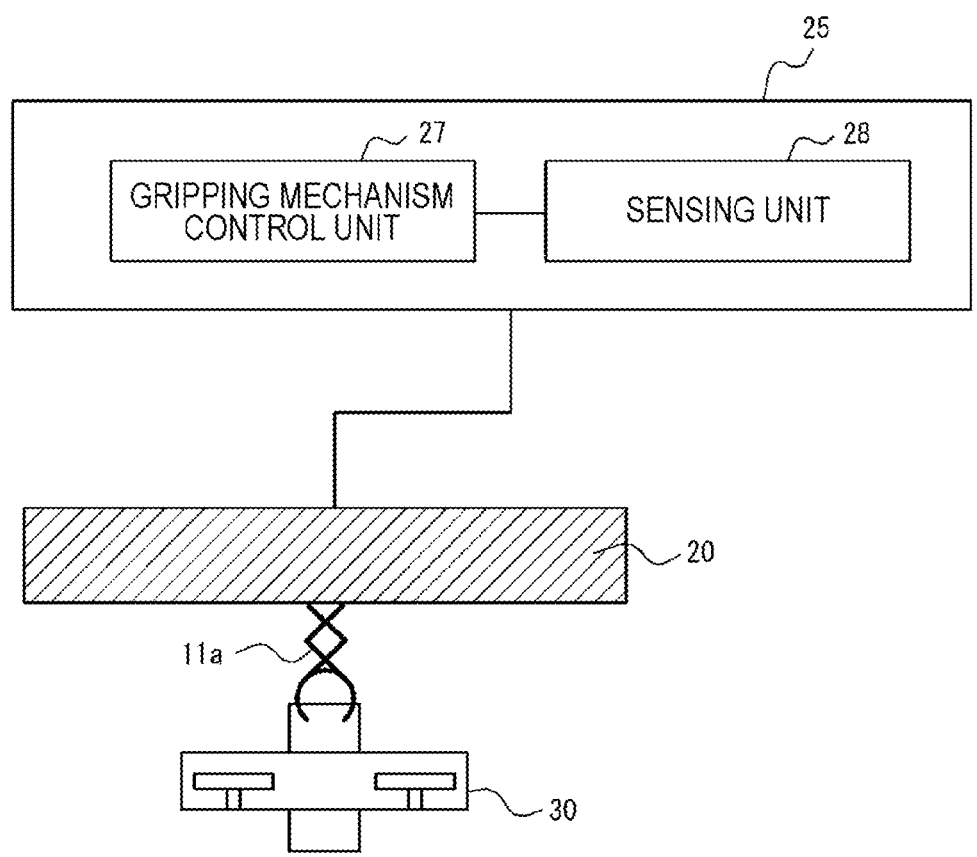
FIG. 18A is a block diagram illustrating an internal configuration example of the main body portion of the storage device.

Next, operations of the main body portion 20 and the unmanned aerial vehicle 30 when the unmanned aerial vehicle 30 departs and returns will be described. FIG. 18A is a block diagram illustrating an internal configuration example of the main body portion 20 of the storage device 10. The main body portion 20 includes a control unit 25 including a gripping portion mechanism control unit 27 and a sensing unit 28. The sensing unit 28 operates as a detection unit that detects the operation of the propeller 351 included in the unmanned aerial vehicle 30. The sensing unit 28 can be implemented using, for example, an infrared sensor or the like. The gripping portion mechanism control unit 27 controls release of the gripping portion 11 on the basis of the operation of the propeller 351 detected by the sensing unit 28. In the present embodiment, the gripping portion mechanism control unit 27 is a processor such as a CPU, an MPU, a GPU, a DSP, or an SoC, and may be configured by a plurality of processors of the same type or different types. The gripping portion mechanism control unit 27 may be configured by dedicated hardware such as an ASIC or an FPGA.

Figure 18B:
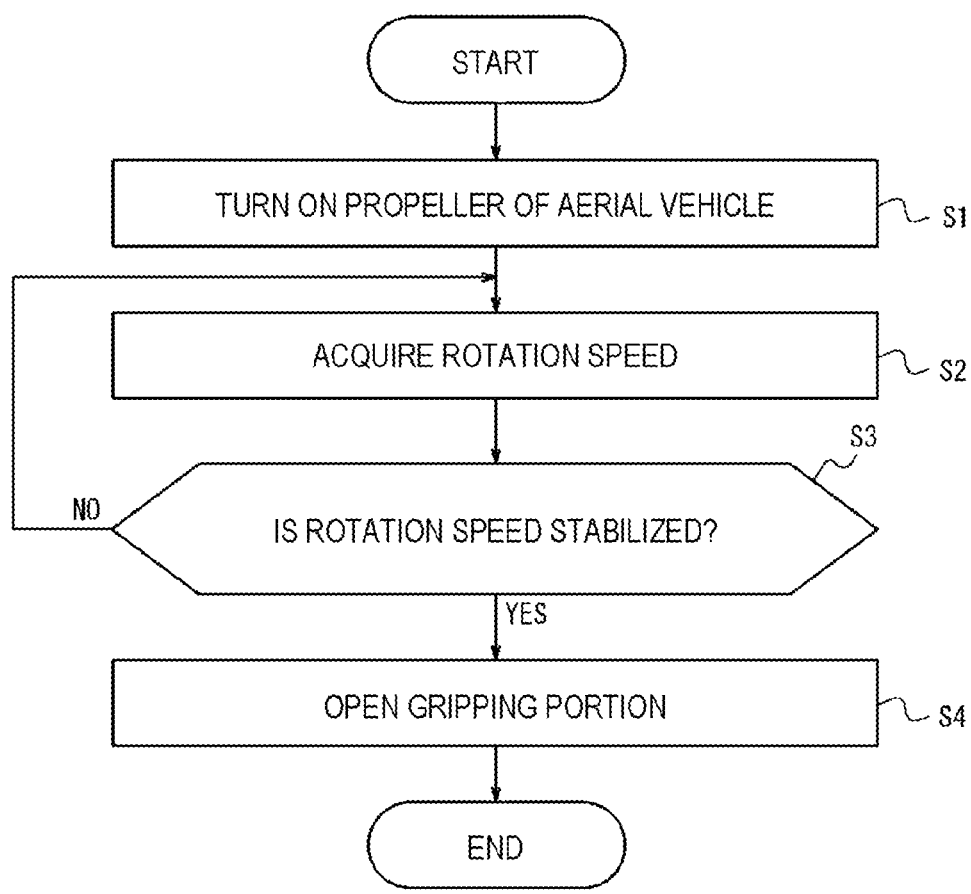
FIG. 18B is a flowchart illustrating an operation procedure in which the unmanned aerial vehicle departs from the gripping portion having the magic hand structure.

FIG. 18B is a flowchart illustrating an operation procedure in which the unmanned aerial vehicle 30 departs from the gripping portion 11a having the magic hand structure. The operation of each step in FIG. 18B is executed under the control of the control unit 31 of the unmanned aerial vehicle 30 or the gripping portion mechanism control unit 27 of the main body portion 20.

In step S1, the control unit 31 turns on the propeller 351 of the unmanned aerial vehicle 30 and starts driving of the motor 352.

In step S2, the gripping portion mechanism control unit 27 acquires the rotation speed of the propeller 351 detected by the sensing unit 28.

In step S3, the gripping portion mechanism control unit 27 determines whether or not the rotation speed of the propeller 351 is stabilized. Specifically, the gripping portion mechanism control unit 27 determines whether or not the unmanned aerial vehicle 30 has reached a rotation speed at which hovering is possible. When the rotation speed has been reached (YES in step S3), the process proceeds to step S4, and when the rotation speed has not been reached (NO in step S3), the process returns to step S2.

In step S4, the gripping portion mechanism control unit 27 performs control to open the gripping portion 11a. Then, the process ends. In this way, since the gripping portion mechanism control unit 27 confirms that the rotation speed of the propeller 351 is stabilized and opens the gripping portion 11, the unmanned aerial vehicle 30 can be safely departed.

Figure 19:
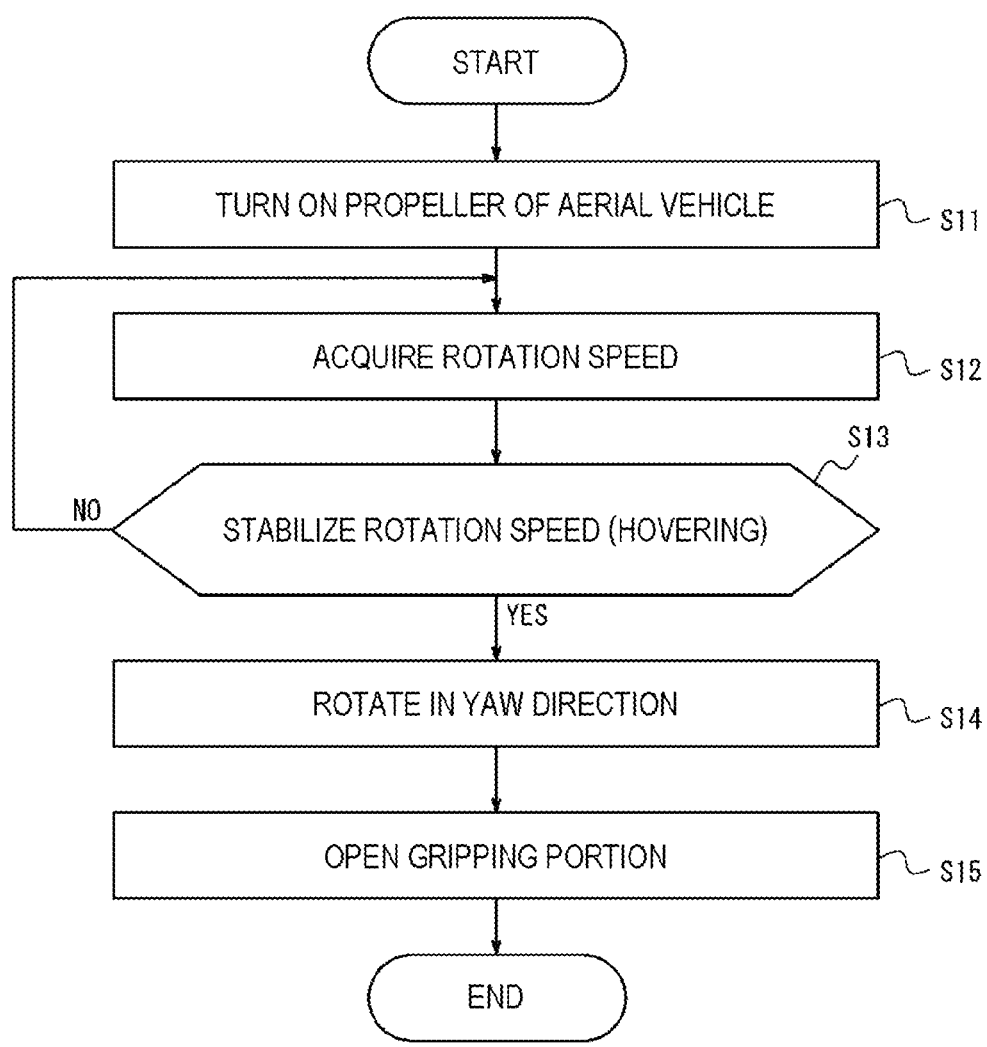
FIG. 19 is a flowchart illustrating an operation procedure in which the unmanned aerial vehicle departs from the gripping portion having the screw structure.

FIG. 19 is a flowchart illustrating an operation procedure in which the unmanned aerial vehicle 30 departs from the gripping portion having the screw structure as illustrated in FIG. 12A. The operation of each step in FIG. 19 is executed under the control of the control unit 31 of the unmanned aerial vehicle 30 or the gripping portion mechanism control unit 27 of the main body portion 20. In FIG. 19, the gripping portion mechanism control unit 27 can rotate the male screw 11d while fixing the unmanned aerial vehicle 30.

In step S11, the control unit 31 turns on the propeller 351 of the unmanned aerial vehicle 30 and starts driving of the motor 352.

In step S12, the gripping portion mechanism control unit 27 acquires the rotation speed of the propeller 351 detected by the sensing unit 28.

In step S13, the gripping portion mechanism control unit 27 determines whether or not the rotation speed of the propeller 351 is stabilized. Specifically, the gripping portion mechanism control unit 27 determines whether or not the unmanned aerial vehicle 30 has reached a rotation speed at which hovering is possible. When the rotation speed has been reached (YES in step S13), the process proceeds to step S14, and when the rotation speed has not been reached (NO in step S13), the process returns to step S12.

In step S14, the gripping portion mechanism control unit 27 rotates the male screw 11d in the direction of loosening the screw while fixing the unmanned aerial vehicle 30.

In step S15, the gripping portion mechanism control unit 27 opens the gripping portion 11a by removing the screw. Then, the process ends. In this way, since the gripping portion mechanism control unit 27 confirms that the rotation speed of the propeller 351 is stabilized and rotates the male screw 11d to open the gripping portion 11, the unmanned aerial vehicle 30 can be safely departed. Note that, here, an example in which the gripping portion mechanism control unit 27 of the main body portion 20 rotates the male screw 11d in step S14 has been described, but the screw may be loosened by yaw rotation of the unmanned aerial vehicle 30.

Figure 20:
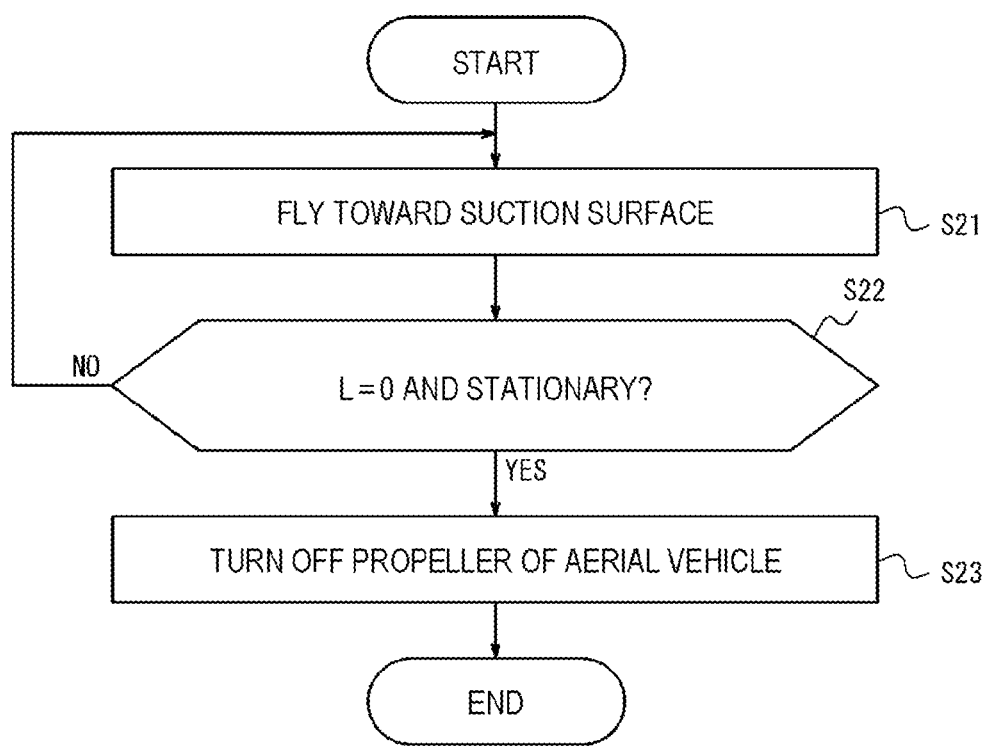
FIG. 20 is a flowchart illustrating an operation procedure in which the unmanned aerial vehicle returns to the suction body of the main body portion of the storage device.

FIG. 20 is a flowchart illustrating an operation procedure in which the unmanned aerial vehicle 30 returns to the suction surface 22 of the main body portion 20 of the storage device 10. An operation in each step of FIG. 20 is executed under the control of the control unit 31 of the unmanned aerial vehicle 30.

In step S21, the control unit 31 causes the unmanned aerial vehicle 30 to fly toward the suction surface 22 of the main body portion 20.

In step S22, the control unit 31 acquires a distance L between the upper surface 313 of the unmanned aerial vehicle 30 and the suction surface 22 of the main body portion 20 by the distance measuring sensor 39. Furthermore, the control unit 31 acquires the acceleration of the unmanned aerial vehicle 30 by the inertial measurement unit 37. The control unit 31 determines whether or not the distance L=0 and the unmanned aerial vehicle 30 is stationary. When L=0 and the unmanned aerial vehicle is stationary (YES in step S22), the process proceeds to step S23; otherwise (NO in step S22), the process returns to step S21.

In step S23, the control unit 31 turns off the propeller 351 of the unmanned aerial vehicle 30 and ends the driving of the motor 352. Then, the process ends. In this way, since the control unit 31 turns off the propeller 351 after confirming that the unmanned aerial vehicle 30 comes into contact with the main body portion 20 and is stationary, the unmanned aerial vehicle 30 can be safely stored in the storage device 10.

Figure 21A:
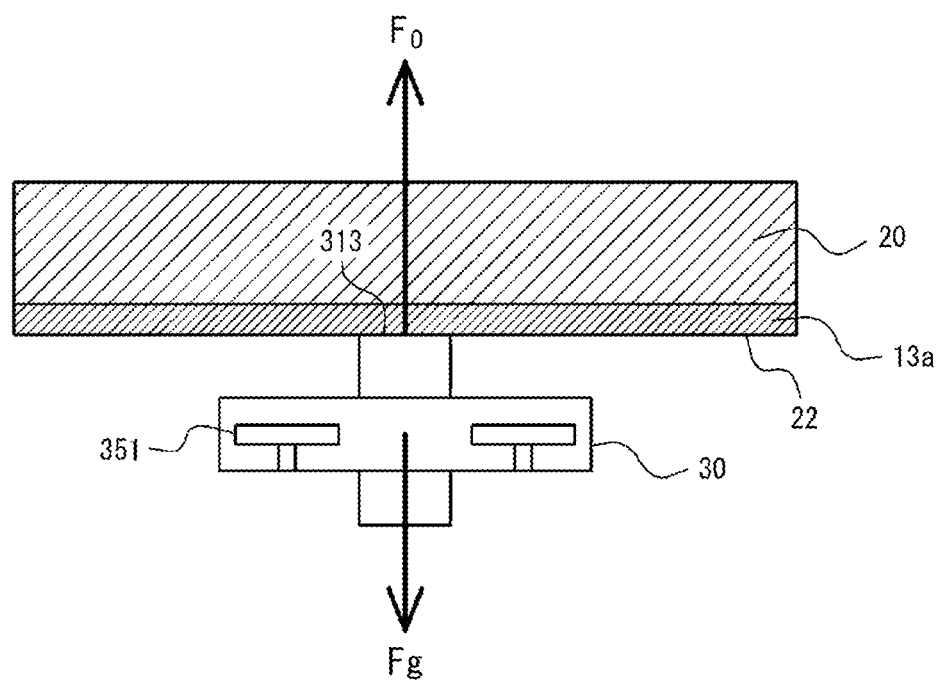
FIG. 21A is a view for describing a state in which the unmanned aerial vehicle departs from the gripping portion of the storage device.
Figure 21B:
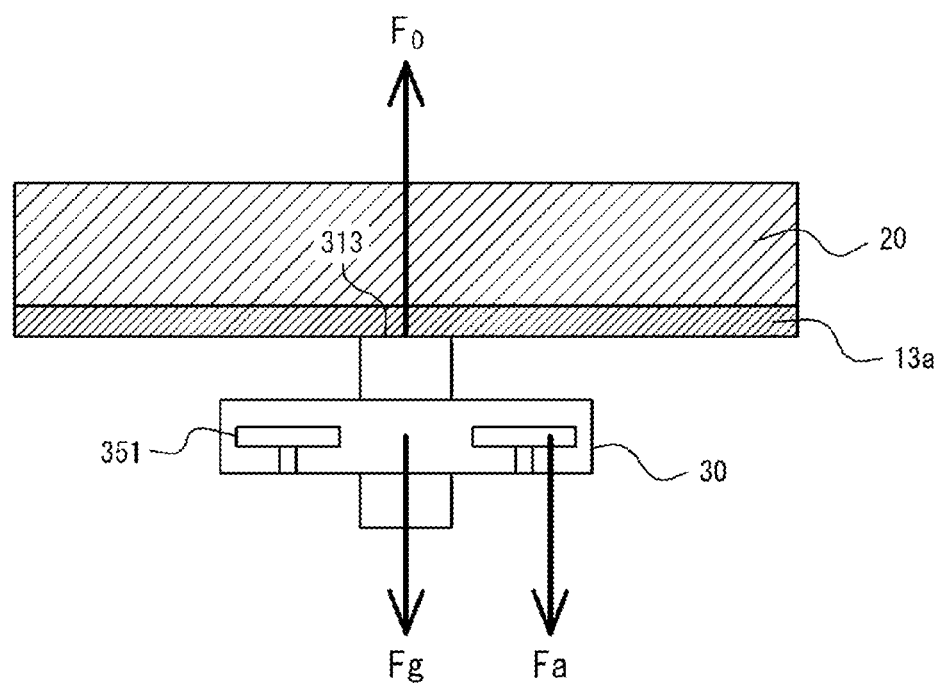
FIG. 21B is a view for describing a state in which the unmanned aerial vehicle departs from the gripping portion of the storage device.

FIGS. 21A and 21B are views for describing a state in which the unmanned aerial vehicle 30 departs from the gripping portion 11 of the storage device 10. In FIGS. 21A and 21B, $F_g$ is the gravity of the unmanned aerial vehicle 30. $F_0$ is the maximum value of the force with which the suction body 13a suctions the unmanned aerial vehicle 30. F a is a force for moving the unmanned aerial vehicle 30 downward by driving the propeller 351. When $F_g+F_a>F_0$, the unmanned aerial vehicle 30 departs away from the main body portion 20.

Figure 21C:
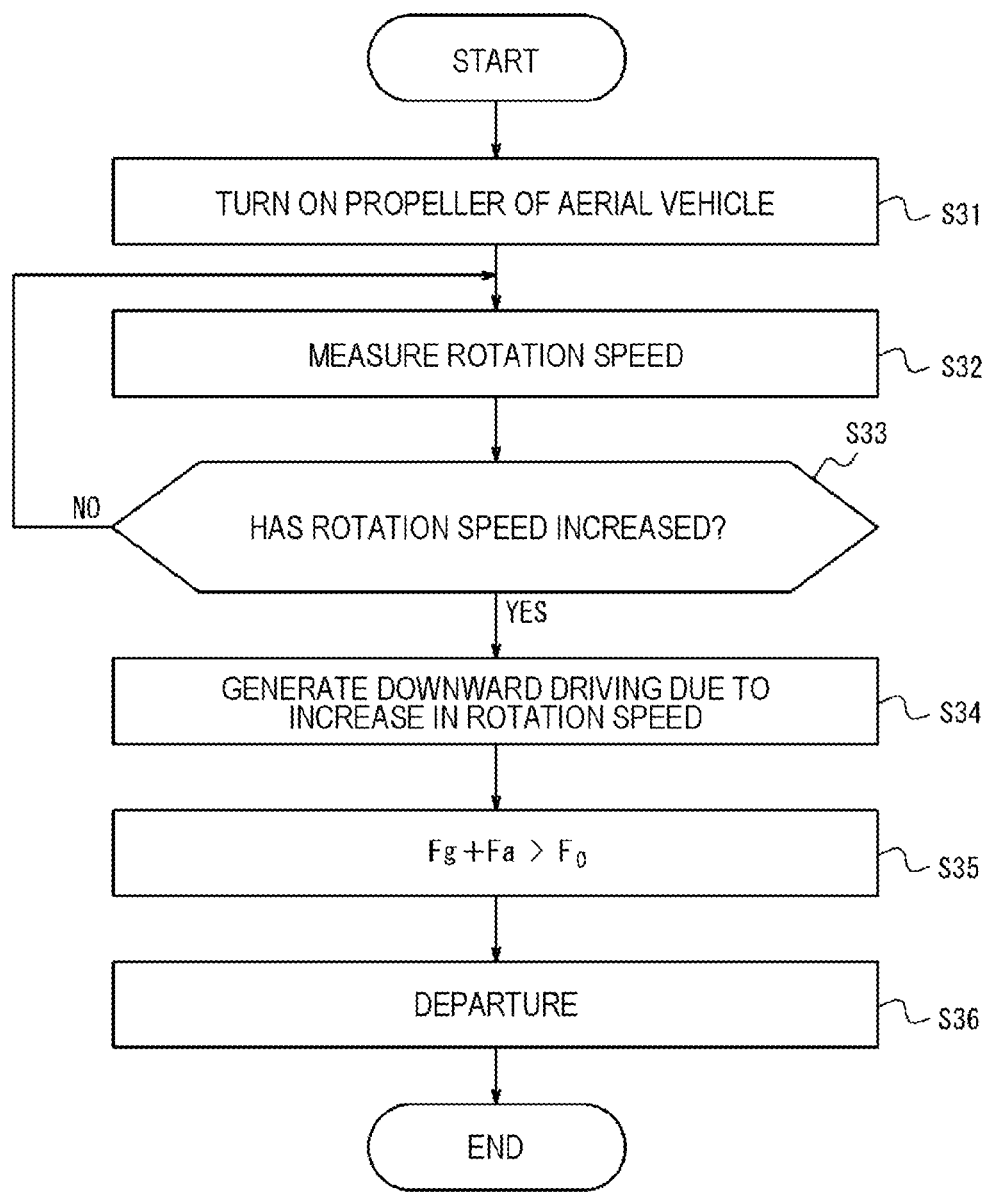
FIG. 21C is a flowchart illustrating an operation procedure in which the unmanned aerial vehicle departs from the gripping portion of the storage device.

FIG. 21C is a flowchart illustrating an operation procedure in which the unmanned aerial vehicle 30 departs from the gripping portion 11 of the storage device 10. An operation in each step of FIG. 21C is executed under the control of the control unit 31 of the unmanned aerial vehicle 30.

In step S31, the control unit 31 turns on the propeller 351 of the unmanned aerial vehicle 30 and starts driving of the motor 352.

In step S32, the control unit 31 acquires the rotation speed of the propeller 351 detected by the sensing unit 28.

In step S33, the control unit 31 determines whether or not the rotation speed of the propeller 351 has increased. When the rotation speed has increased (YES in step S33), the process proceeds to step S34, and when the rotation speed has not increased (NO in step S33), the process returns to step S32.

In step S34, downward driving is generated due to an increase in the rotation speed of the propeller 351. Therefore, $F_a$ increases.

In step S35, $F_g+F_a>F_0$ is satisfied as $F_a$ increases. Accordingly, the unmanned aerial vehicle 30 is separated from the main body portion 20.

In step S36, the control unit 31 controls the unmanned aerial vehicle 30 to depart. Then, the process ends.

As described above, in the inspection system 1, the storage device 10 that stores the unmanned aerial vehicle 30 includes the gripping portion 11 for gripping the unmanned aerial vehicle 30 and the main body portion 20 having the suction surface 22 to which the upper surface 313 of the unmanned aerial vehicle 30 is suctioned. Therefore, with the storage device 10, it is possible to safely perform the inspection without human intervention in departure and return operations of the inspection by the flight vehicle regardless of whether the flight vehicle is under the ground or on the ground, or indoors or outdoors. In addition, since the inspection system 1 has a mechanism in which the departure and the return are different, does not require modification of the flight vehicle, and has a mechanism using an operation of normal flight, it is easy to perform the inspection.

The present disclosure is not limited to the embodiments described above. For example, a plurality of blocks in the block diagrams may be integrated, or one block may be divided. The plurality of steps in the flowchart may be executed in parallel or in a different order depending on throughput of a device that executes each step or as necessary, instead of being chronologically executed according to the description. Further, modifications can be made within the gist of the present disclosure.

REFERENCE SIGNS LIST

1 Inspection system
10 Storage device
11 Gripping portion
12 Hook
13 Suction body
14 Impact absorber
16 Hole
20 Main body portion
21 Lower surface
22, 23 Suction surface
25 Control unit
27 Gripping mechanism control unit
28 Sensing unit
30 Unmanned aerial vehicle
31 Control unit
32 Memory
33 Communication unit
34 Camera
35 Rotary blade mechanism
36 GNSS receiver
37 Inertial measurement unit
38 Magnetic compass
39 Distance measuring sensor
45 Cylinder
50 Terminal
100 Manhole
101 Accumulated water
311 Control box
313 Upper surface portion
317 Bumper
318 Member
319 Valve
351 Propeller
352 Motor
355 Opening

The invention claimed is:

1. A system comprising:
a storage device comprising:
 a gripping mechanism that grips an unmanned aerial vehicle; and
 a main storage body portion including an adhesive surface of the main storage body portion, wherein the adhesive surface of the main storage body portion adheres an upper surface of the unmanned aerial vehicle; and
the unmanned aerial vehicle comprising:
 a propeller;
 the upper surface;
 a main vehicle body portion including an adhesive surface on the upper surface, the adhesive surface of the upper surface being for adhering to the main storage body portion of the storage device;
 a hook; and
 wherein the unmanned aerial vehicle is adhered to the adhesive surface of the main body portion by at least one of a gel-like adhesive body, a suction cup, a hook-and-loop fastener, and a needle, which are provided on at least one of the adhesive surface of the main body portion and the upper surface of the unmanned aerial vehicle, and an impact absorber is provided between the adhesive surface of the main body portion and the upper surface of the unmanned aerial vehicle.

2. The system according to claim 1, wherein the storage device further comprises:
 a detection unit that detects an operation of the propeller included in the unmanned aerial vehicle; and
 a controller unit that releases the gripping mechanism based on the operation of the propeller detected by the detection unit.

3. The system according to claim 2,
wherein the main storage body portion includes a hole for taking in and out the gripping mechanism.

4. The system according to claim 2,
wherein the gripping mechanism grips the unmanned aerial vehicle by suspending the hook provided on the unmanned aerial vehicle.

5. The system according to claim 1,
wherein the main storage body portion includes a hole for taking in and out the gripping mechanism.

6. The system according to claim 1,
wherein the gripping mechanism grips the unmanned aerial vehicle by suspending the hook provided on the unmanned aerial vehicle.

* * * * *